(12) United States Patent
Guemmer

(10) Patent No.: US 7,364,404 B2
(45) Date of Patent: Apr. 29, 2008

(54) TURBOMACHINE WITH FLUID REMOVAL

(75) Inventor: Volker Guemmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 114 days.

(21) Appl. No.: 10/996,619

(22) Filed: Nov. 26, 2004

(65) Prior Publication Data

US 2005/0238483 A1    Oct. 27, 2005

(30) Foreign Application Priority Data

Nov. 26, 2003   (DE) .............................. 103 55 240

(51) Int. Cl.
*F04D 29/68* (2006.01)

(52) U.S. Cl. ........................... 416/91; 415/914

(58) Field of Classification Search ................ 415/115, 415/914; 416/90 R, 91, 92, 98, 232
See application file for complete search history.

(56) References Cited

U.S. PATENT DOCUMENTS

| | | | |
|---|---|---|---|
| 2,933,238 A | 4/1960 | Stalker | |
| 3,066,912 A | 12/1962 | Scheper | |
| 3,572,960 A | 3/1971 | McBride | |
| 3,694,102 A * | 9/1972 | Conrad ........................ | 415/115 |
| 3,846,038 A | 11/1974 | Carriere et al. | |
| 3,993,414 A | 11/1976 | Meauze et al. | |
| 4,155,680 A | 5/1979 | Linko | |
| 4,415,310 A * | 11/1983 | Bouiller et al. ................ | 416/95 |
| 4,642,027 A | 2/1987 | Popp | |
| 5,059,093 A | 10/1991 | Khalid | |
| 5,203,162 A | 4/1993 | Burge | |
| 5,230,605 A | 7/1993 | Yamaguchi | |
| 5,327,716 A * | 7/1994 | Giffin et al. ................... | 60/772 |
| 5,480,284 A * | 1/1996 | Wadia et al. .................. | 416/91 |
| 5,762,034 A | 6/1998 | Foss | |
| 5,876,182 A | 3/1999 | Schulte | |
| 6,109,868 A | 8/2000 | Burlman | |
| 6,302,640 B1 | 10/2001 | McKelvey | |
| 6,574,965 B1 * | 6/2003 | Feulner ........................ | 60/785 |
| 6,585,479 B2 | 7/2003 | Torrance | |

(Continued)

FOREIGN PATENT DOCUMENTS

DE          889506       10/1953

(Continued)

OTHER PUBLICATIONS

German Search Report dated Aug. 3, 2004.

(Continued)

*Primary Examiner*—Edward K. Look
*Assistant Examiner*—Devin Hanan
(74) *Attorney, Agent, or Firm*—Timothy J. Klima

(57) ABSTRACT

A turbomachine includes at least one rotor (6), at least one stator (7), and a casing (1), with the rotor (6) comprising several rotor blades (8) attached to a rotating shaft, and with the stator (7) being provided with stationary stator blades (9), the casing (1) being passed by a fluid flowing through the rotor (6) and stator (7). Provision is made for the removal of fluid on at least one blade (8, 9) of a blade row of the rotor (6) and/or the stator (7) on non-axially symmetrical, aerodynamically critical locations on blade tip and annulus surfaces (SRO).

37 Claims, 28 Drawing Sheets

U.S. PATENT DOCUMENTS

| | | | |
|---|---|---|---|
| 6,663,346 B2 * | 12/2003 | Munsell et al. | 416/97 R |
| 7,097,414 B2 | 8/2006 | Stangeland | |
| 2003/0026695 A1 | 2/2003 | Schmuecker | |
| 2004/0081552 A1 | 4/2004 | Guemmer | |
| 2005/0019152 A1 | 1/2005 | Seitz | |
| 2005/0226717 A1 * | 10/2005 | Xu | 415/58.5 |
| 2006/0104805 A1 * | 5/2006 | Gummer | 415/58.5 |

FOREIGN PATENT DOCUMENTS

| | | |
|---|---|---|
| DE | 1042828 | 11/1958 |
| DE | 1428188 | 11/1968 |
| DE | 3407945 | 9/1985 |
| DE | 19632207 | 2/1998 |
| DE | 10135003 C1 | 10/2002 |
| DE | 10233032 | 1/2004 |
| DE | 10330084 A1 | 3/2004 |
| EP | 0497574 B1 | 9/1995 |
| EP | 0718469 B1 | 12/1995 |
| EP | 0719908 B1 | 3/2000 |
| EP | 1013937 | 6/2000 |
| EP | 1286022 | 2/2003 |
| GB | 619722 | 3/1949 |
| GB | 987625 | 3/1965 |

OTHER PUBLICATIONS

U.S. Appl. No. 11/159,296, filed Jun. 23, 2005.
U.S. Appl. No. 10/966,601, filed Nov. 26, 2004.
U.S. Appl. No. 11/218,521, filed Sep. 6, 2005.
U.S. Appl. No. 11/280,817, filed Nov. 17, 2005.

* cited by examiner

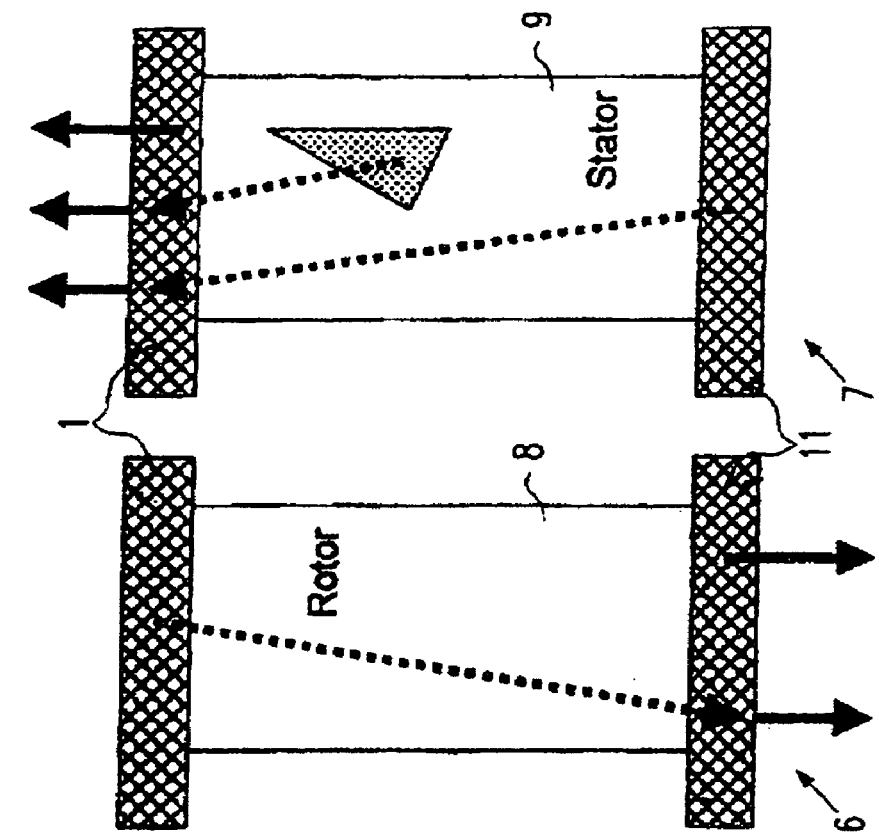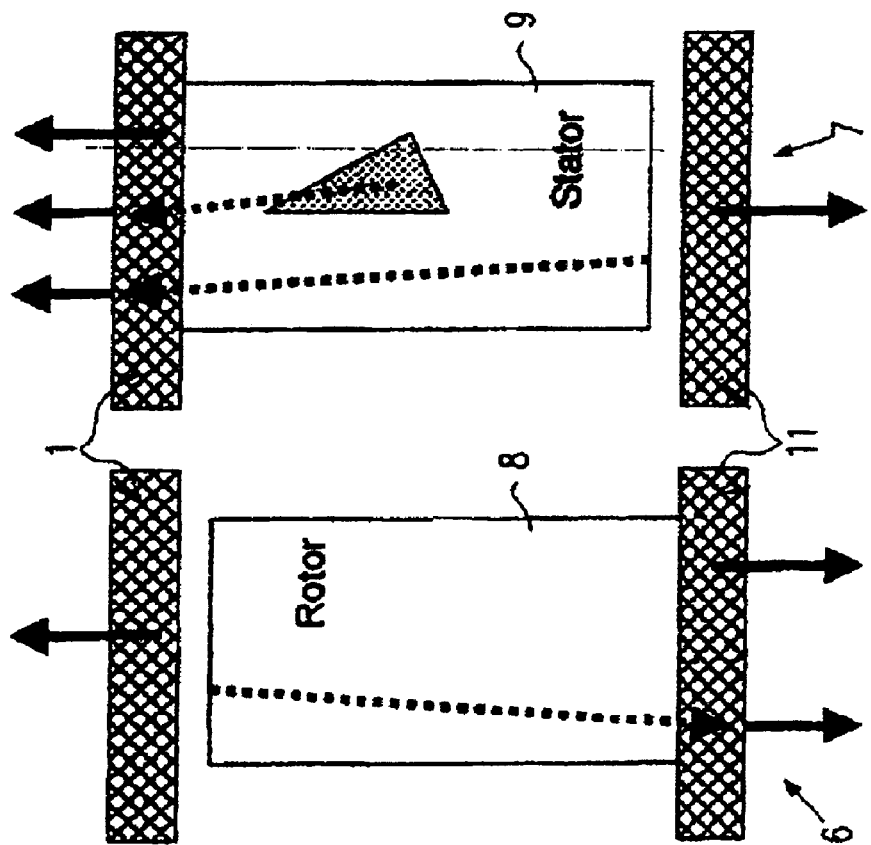
Fig. 3

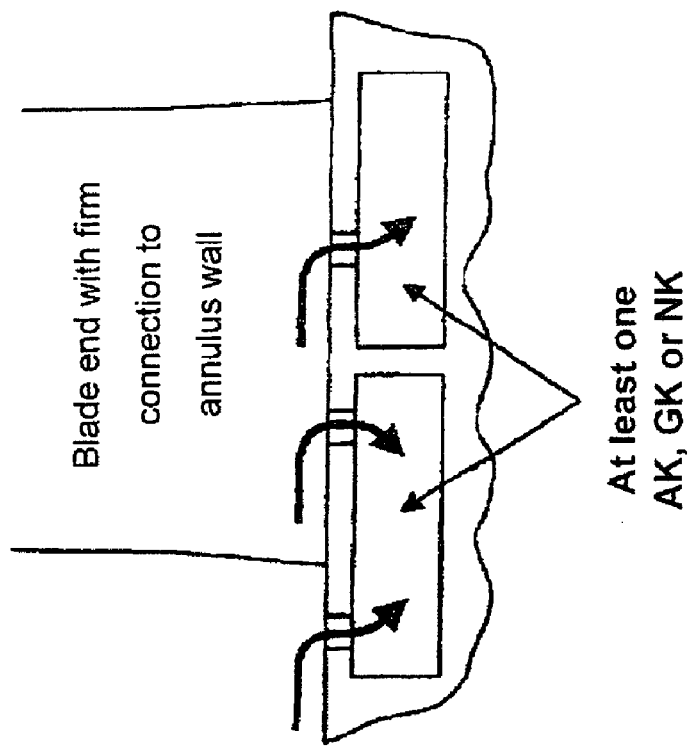
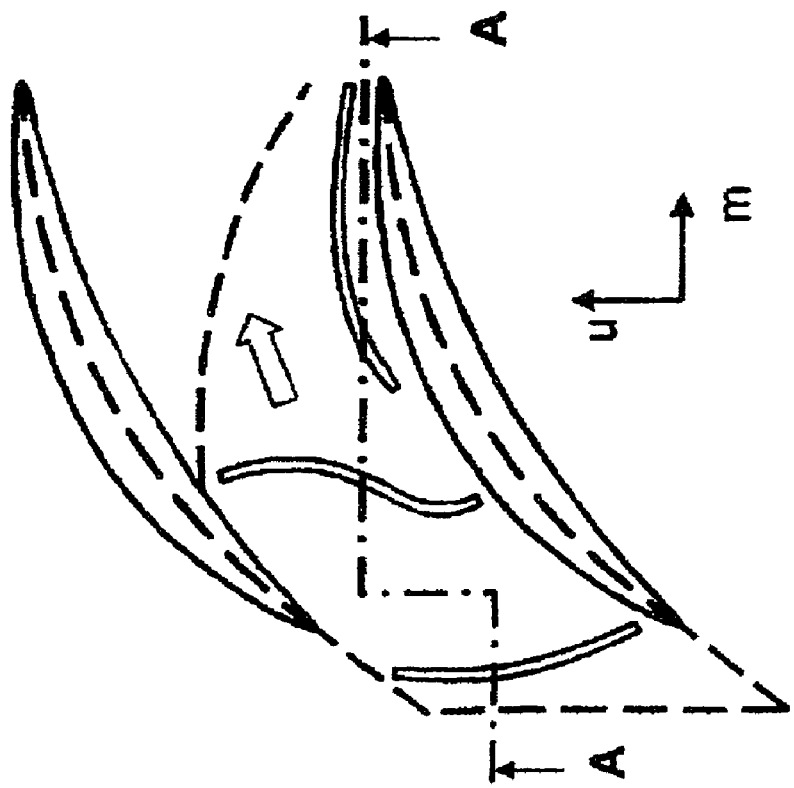
Fig. 16

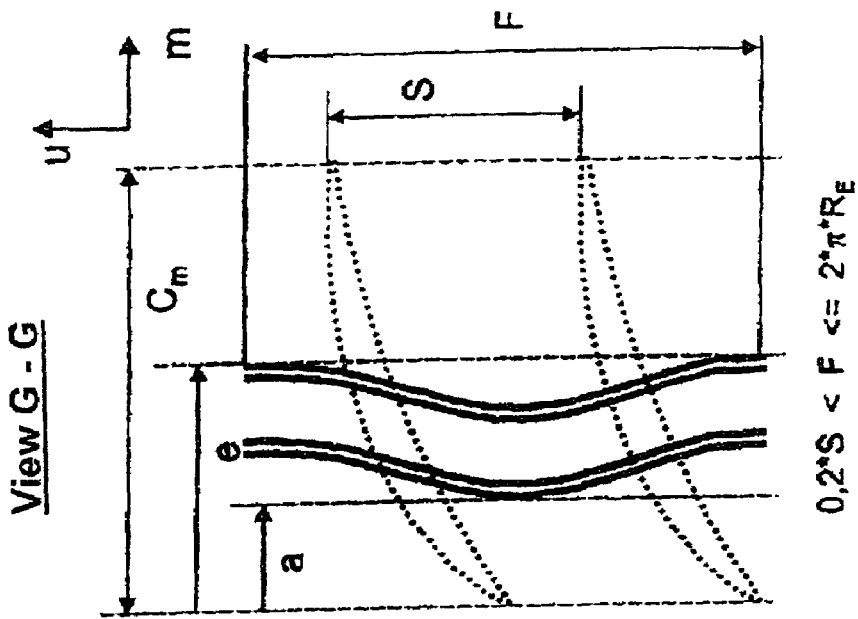
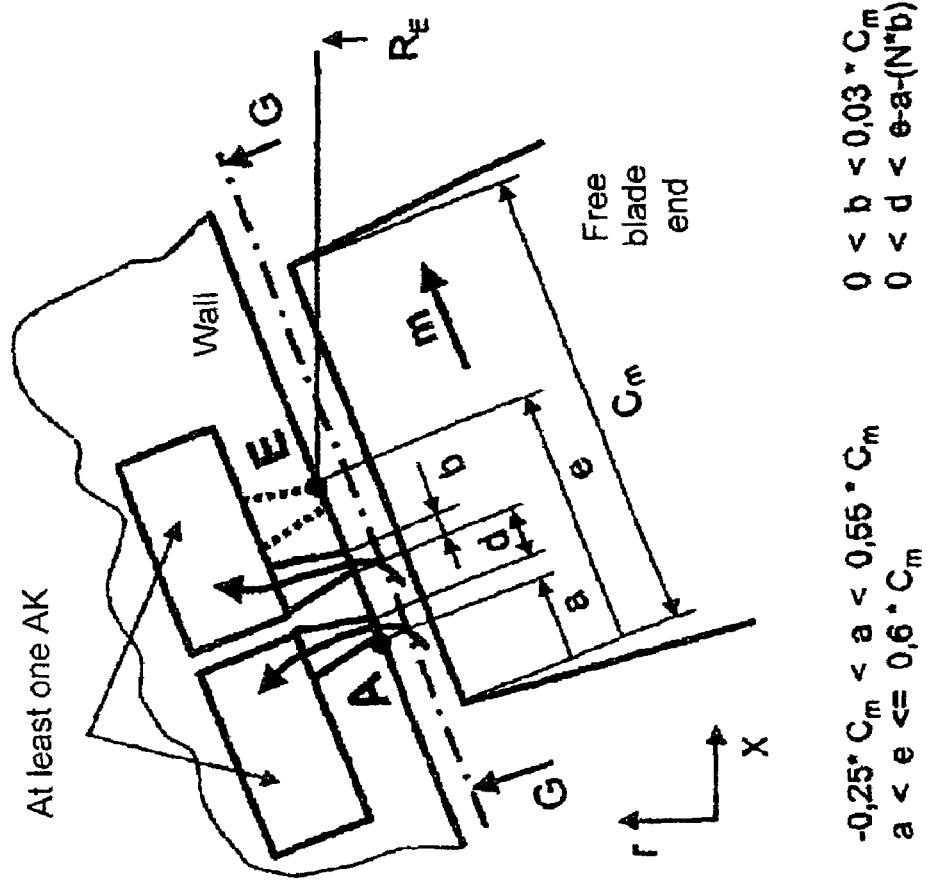
Fig. 19

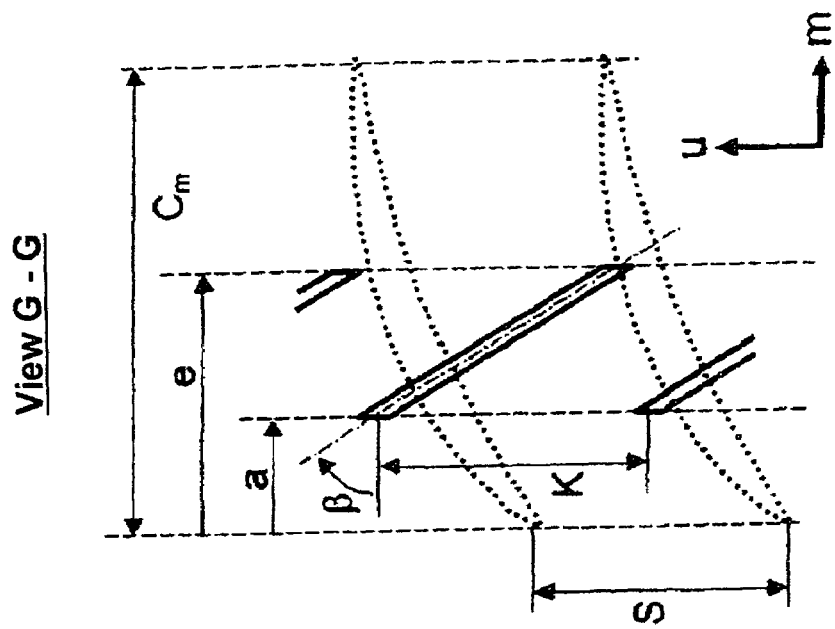
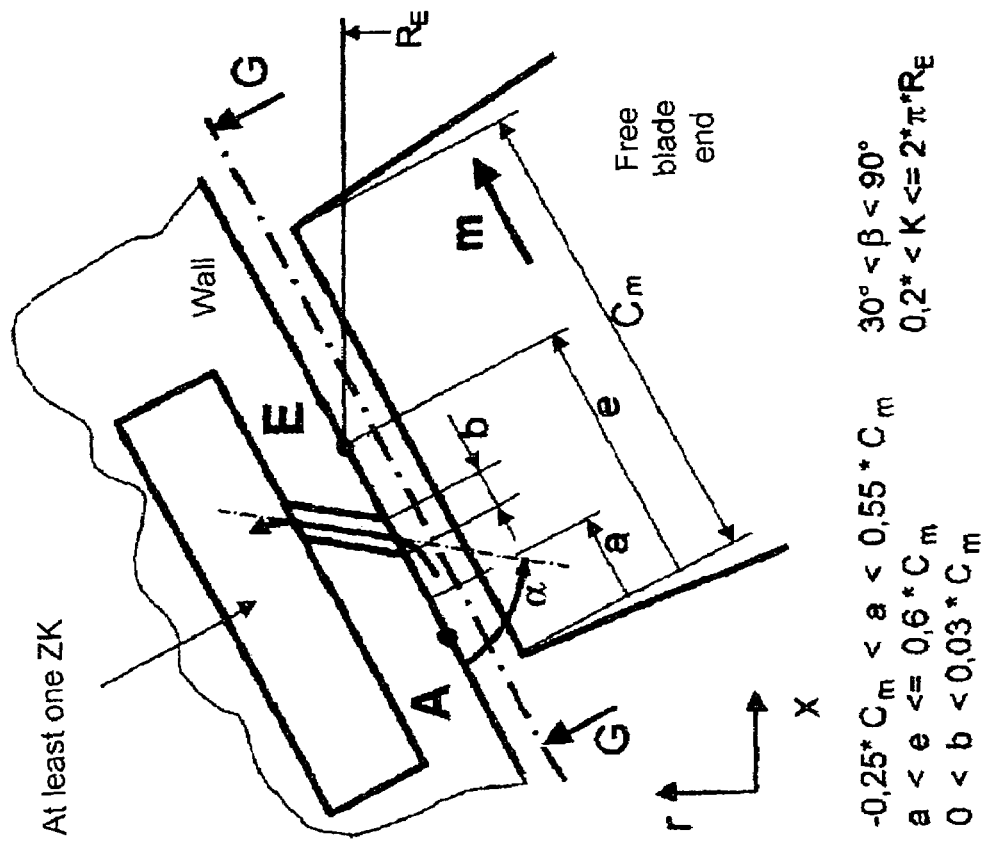
Fig.20

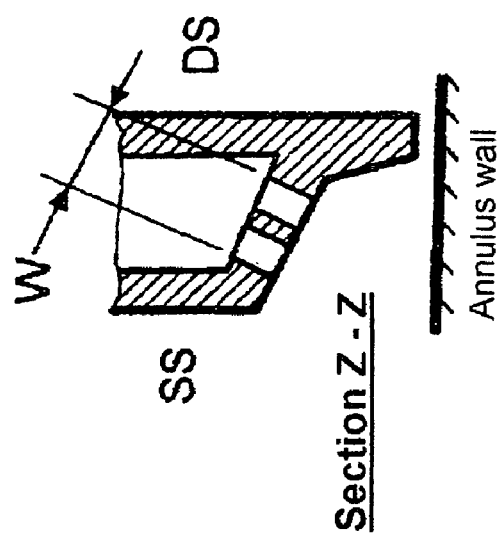
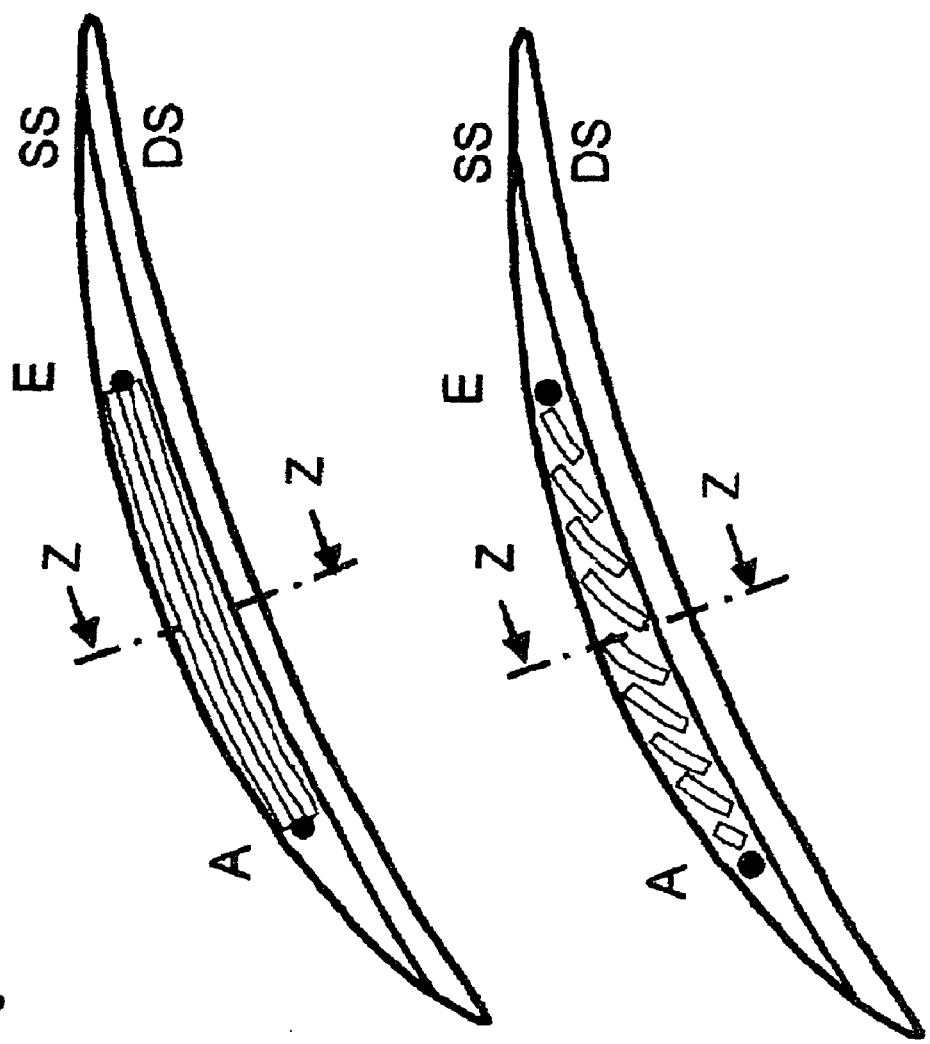
Fig. 23

TURBOMACHINE WITH FLUID REMOVAL

This application claims priority to German Patent Application DE10355240.5 filed Nov. 26, 2003, the entirety of which is incorporated by reference herein.

BACKGROUND OF THE INVENTION

The present invention relates to turbomachines, such as blowers, compressors, pumps and fans of the axial, semi-axial and radial type. The working medium may be gaseous or liquid.

More particularly, this invention relates to a turbomachine with at least one rotor, with the rotor comprising several rotor blades attached to a rotating shaft. At least one stator can exist, with the stator being provided with stationary stator blades. A casing can exist which confines the passage of fluid through the rotor and the stator in the outward direction.

The aerodynamic loadability and the efficiency of turbomachines, for example blowers, compressors, pumps and fans, is limited by the growth and the separation of boundary layers on the blades as well as on the hub and casing walls.

To remedy this fundamental problem, the state of the art proposes that the boundary layer of the fluid be removed. Apart from this very general provision, the known solutions are trivial and only partially effective.

FIGS. 1 and 2 schematically show the solutions known from the state of the art. Here, FIG. 1 schematically shows a casing 1 and a hub 11 between which a fluid flow passes from the left-hand side, as indicated by the big arrow. Reference numeral 2 schematically shows a blade, with the visible area of this blade being the "suction side". As indicated by the upward arrows of FIG. 1, air is locally removed on the blade suction side and in the axial gap in axially symmetric arrangement. The downward, left-hand arrow shows a removal of air on a rotor or stator via a circumferential slot 3 before the blade. Reference numeral 4 shows a solution in which air is removed via a slot on a stator and via a perforation, a slot, holes or a ramming inlet on a rotor.

The upward arrow in FIG. 2 shows global removal of air via porous blade surfaces. Reference numeral 5 designates a stator in a fine-pore, sweating material.

The state of the art accordingly describes various methods for pointwise removal of the boundary layer in flow direction via slots or holes on the blade suction side or via axially symmetric slots on the sidewalls (hub, casing) before the blade. Also, as already mentioned, the removal of air by way of global boundary layer suction distributed over the entire blade surface by way of fine-pore material has been proposed for stators.

The measures described either are not specifically geared to aerodynamically particularly problematic zones within the blade passage or are simply orientated to a two-dimensional profile envelopment, without considering the complex, three-dimensional aerodynamic processes in the side wall area of a blade (near a hub or on a casing).

Normally, in the state of the art, the boundary layer is initially led to the blade interior and is then discharged from the blade and the annulus of the turbomachine.

Only one solution provides for suction of the boundary layer on the suction side of a blade and its direct return at the tip of the same blade.

Furthermore, drafts exist in the state of the art that provide circumferential slots before or behind a blade row on a hub or a casing to suck off the side wall boundary layer there. This measure is solely aimed at the reduction of the boundary layer thickness at the blade entry, without being specifically geared to particularly problematic side wall zones within the blade passage.

The above state of the art is documented in writing in the following publications.

For boundary layer suction on the blade surface via holes, individual slots or porous zones, reference is made to the following U.S. patents:

U.S. Pat. No. 2,870,957
U.S. Pat. No. 2,720,356
U.S. Pat. No. 3,694,102
U.S. Pat. No. 3,993,414
U.S. Pat. No. 5,904,470
U.S. Pat. No. 5,480,284

For boundary layer suction on the hub or on the casing via circumferential slots before or behind the blade row, reference is made to the following Publications:

Schuler et al.: Design, Analysis, Fabrication and Test of an Aspirated Fan Stage, ASME Paper 2000-GT-618, and Merchant et al.: Aerodynamic Design and Analysis of a High Pressure Ratio Aspirated Compressor Stage, ASME Paper 2000-GT-619.

In the state of the art, it is disadvantageous that the existing solutions are not highly effective and, in particular, are unfavorable with regard to the efficiency of the turbomachinery. Rather, the existing suction concepts are relatively primitive and provide for suction of the profile boundary layers either only on the blade surface or in combination with suction before the blade row via axially symmetric annular slots on the hub or casing.

BRIEF SUMMARY OF THE INVENTION

A broad aspect of the present invention is to provide a turbomachine of the type specified above which, while avoiding the disadvantages of the state of the art, is characterized by highly effective removal of the boundary layer and high efficiency.

It is a particular object of the present invention to provide solution to the above problems by a combination of the characteristics described below. Further advantageous embodiments of the present invention will be apparent from present description.

The turbomachine according to the present invention can comprise one or more stages, each with one rotor and one stator; in isolated cases, the stage may also consist of a rotor only.

According to the present invention, the rotor includes a number of blades which are connected to a rotating shaft of the turbomachine and impart energy to the working medium. The rotor can be shrouded or shroudless at the outer blade end. According to the present invention, the stator includes a number of stationary blades with fixed or free blade ends on the casing side and on the hub side.

The rotor drum and the blading according to the present invention are usually enclosed by a casing, in other cases, such as aircraft or ship propellers, no such casing exists.

According to the present invention, the turbomachine may also be provided with a stator upstream of the first rotor, a so-called inlet guide vane assembly.

In accordance with the present invention, at least one stator or inlet guide vane assembly, instead of being fixed, can be variable to change the angle of attack. A spindle accessible from the outside of the annulus can, for example, accomplish such a variation.

The turbomachine may, in a special form, also be provided with at least one row of variable rotors.

In an alternative configuration of the turbomachine according to the present invention, multi-stage types of said turbomachine may have two counter-rotating shafts, with the direction of rotation of the rotor blade rows alternating between stages. Here, no stators exist between subsequent rotors.

In accordance with the present invention, the turbomachine may alternatively also have a bypass configuration, with the single-flow annulus dividing into two concentric annuli behind a certain blade row, with each of these annuli housing at least one further blade row.

Specifically, according to the present invention, a turbomachine has been provided which comprises means for the removal of fluid on at least one blade of a blade row of the rotor and/or the stator on non-axially symmetric, aerodynamically critical locations on blade tip and annulus surfaces (SRO).

Alternatively, or in addition to the fluid removal devices on blade tip and annulus surfaces (SRO), the turbomachine, in accordance with the present invention, is provided with means for fluid removal on at least one blade of a stator row, these means being distributed over a defined area in meridional flow direction, not pointwise, on the blade suction side, with the meridional extension in meridional flow lines or orthogonal direction decreasing towards at least one of the annulus walls (hub or casing) (suction-side, intensity-variable fluid removal—SIFE).

BRIEF DESCRIPTION OF THE DRAWINGS

The present invention is more fully described in the light of the accompanying drawings showing preferred embodiments. In the drawings, FIG. 3 is a schematic representation of the basic concept in accordance with the present invention, FIGS. 14 to 17 show embodiments of a fluid removal device in accordance with the present invention on blade tips and annulus surfaces (SRO) of the type A, FIGS. 18 to 21 show embodiments of a fluid removal device in accordance with the present invention on blade tips and annulus surfaces (SRO) of the type B, FIGS. 22 to 24 show embodiments of a fluid removal device in accordance with the present invention on blade tips and annulus surfaces (SRO) of the type C.

DETAILED DESCRIPTION OF THE INVENTION

Figure 2:
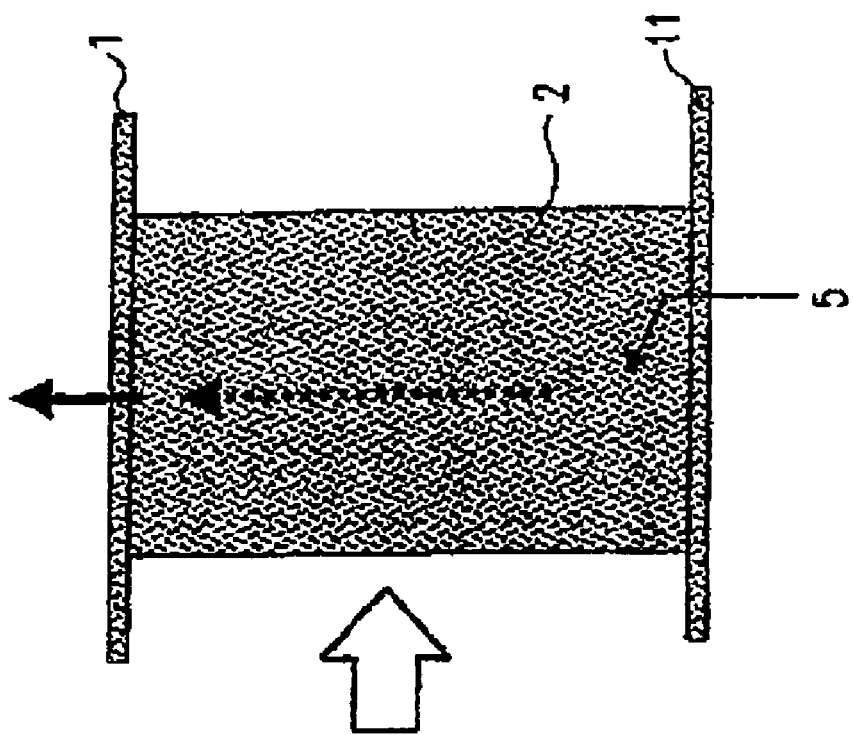
FIG. 2 is a modified representation of a further embodiment known from the state of the art.
Figure 1:
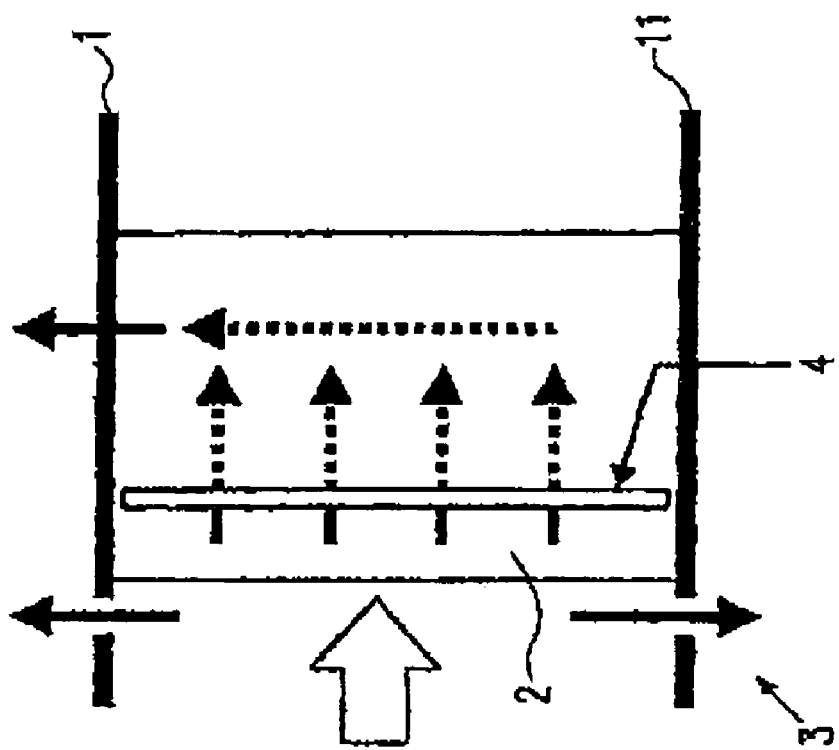
FIG. 1 is a schematic representation of the state of the art.

FIG. 3 shows, in highly simplified representation, the solution according to the present invention on four differently configured blade rows, each comprising a rotor 6 or a stator 7, respectively, which are provided with rotor blades 8 or stator blades 9, respectively. Reference numeral 1 shows, in highly simplified representation, a casing or an outer shroud. Reference numeral 11 designates a rotor drum or an inner shroud. Shown is the suction side of the respective blade. On stators, a zone for suction-side, intensity-variable fluid removal (SIFE) is provided.

Figure 4:
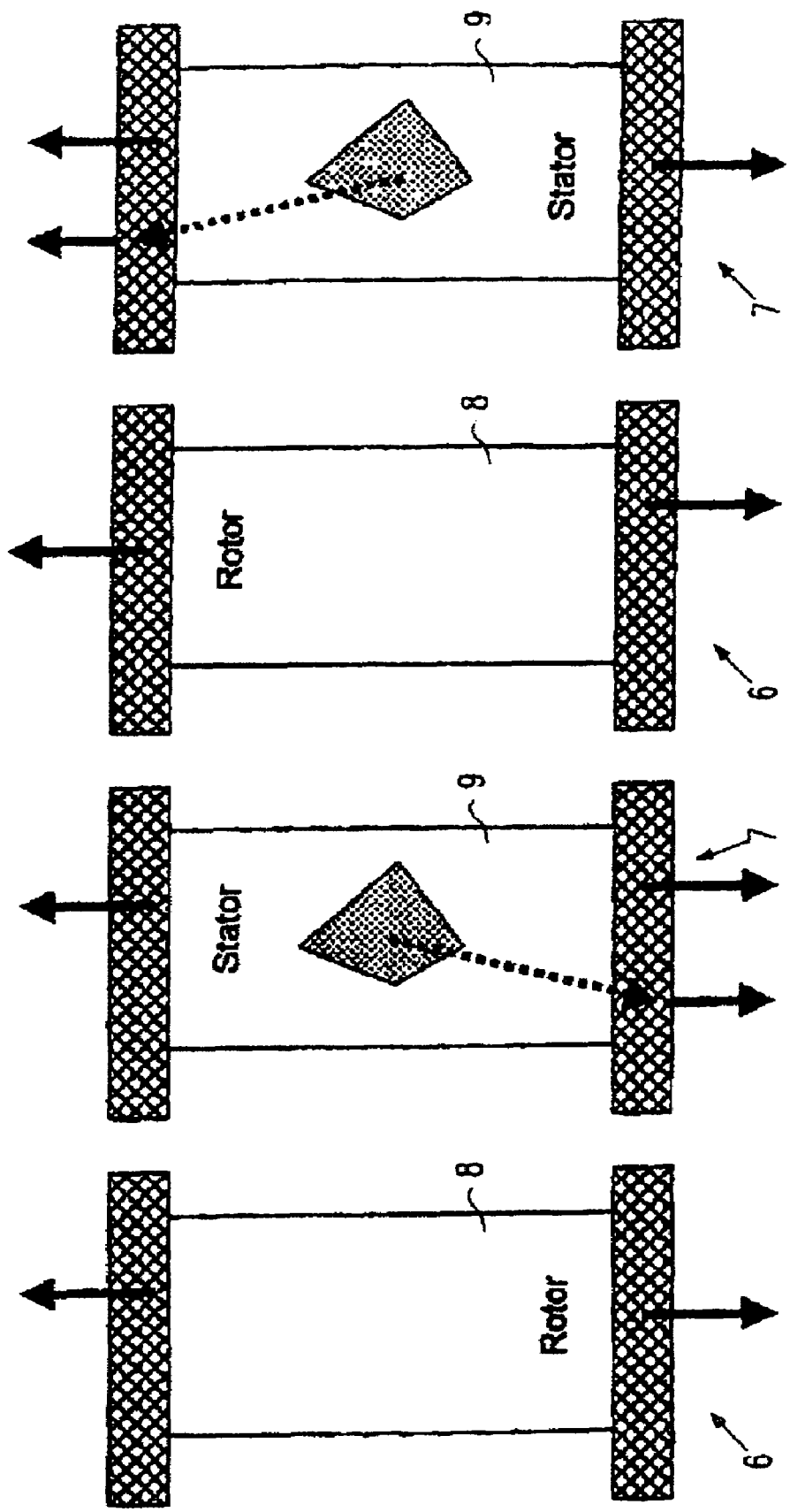
FIG. 4 is a further representation of different variants in accordance with the present invention.

FIG. 4 analogically shows the basic concept according to the present invention.

Figure 5:
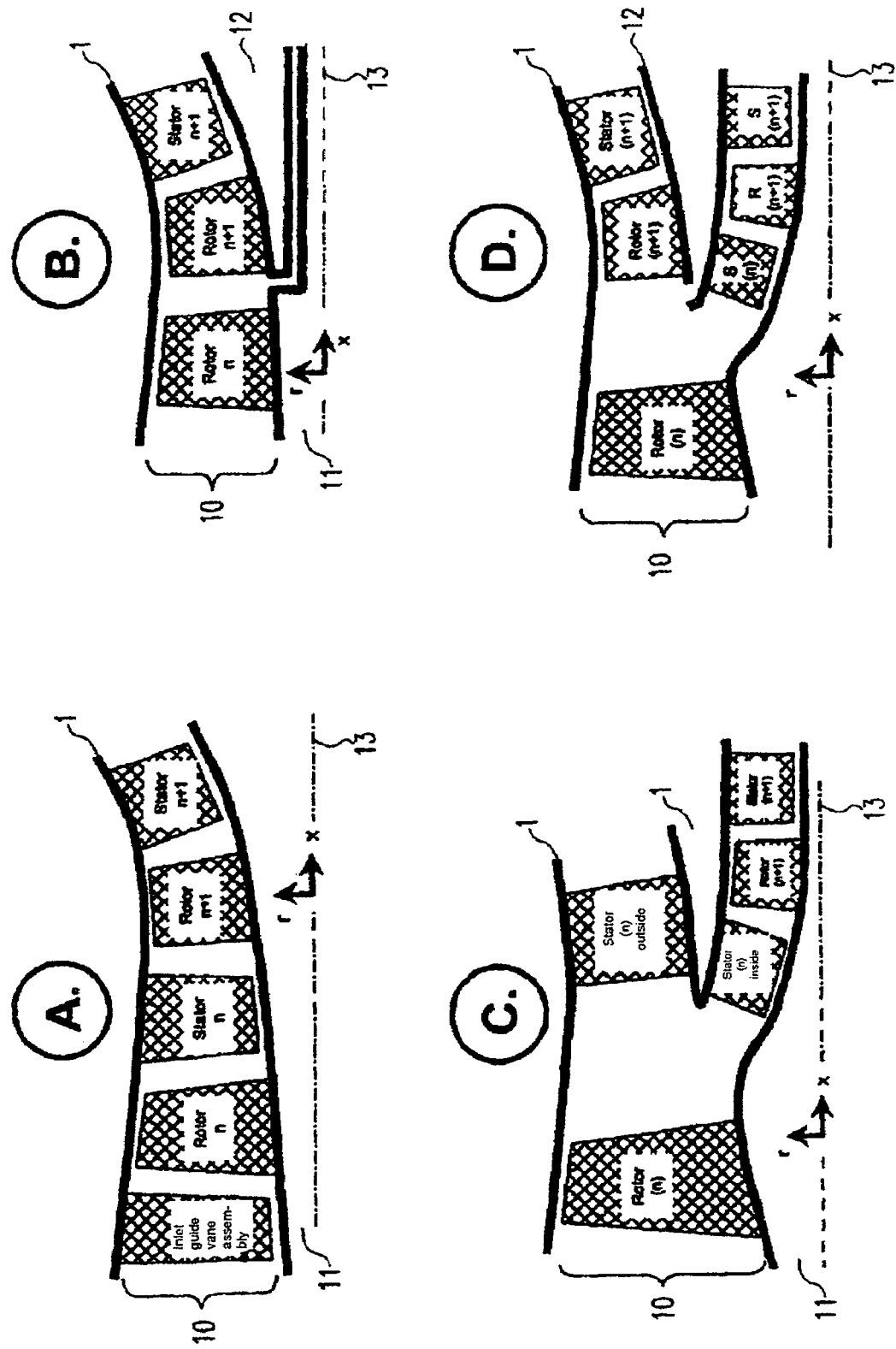
FIG. 5 shows different variants and configurations of the turbomachine in accordance with the present invention.

FIG. 5 shows four different configurations of the turbomachine according to the present invention. Here, reference numeral 10 indicates an annulus through which fluid will pass from the left-hand to the right-hand side, reference numeral 13 indicates the machine axis around which a rotor drum (hub) 11 rotates. In the examples shown in FIGS. 5B and 5D, a further rotor drum (hub) 12 is provided. The rotors, stators and the inlet guide vane assembly are identified in FIG. 5, with one blade being schematically shown in each case.

Figure 6:
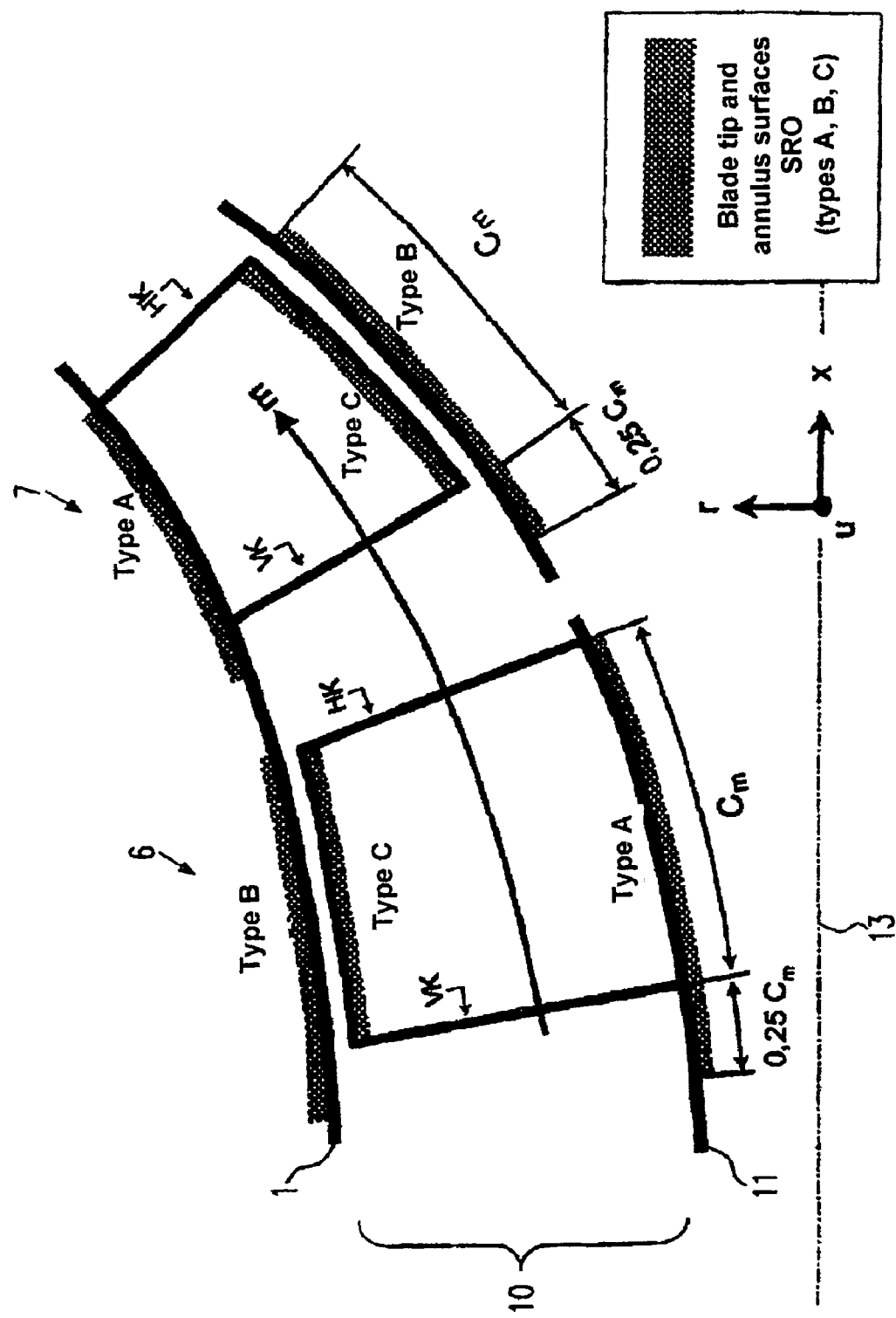
FIG. 6 is a representation regarding the definition of the term SRO in accordance with the present invention.

FIG. 6 shows the definition of the blade tip and annulus surfaces (SRO) according to the present invention. Three types are shown altogether. Again in simplified representation, a rotor 6 and a stator 7 are shown, these being arranged in the annulus 10 between a casing 1 and a hub (rotor drum) 11.

The present invention accordingly provides for the following types of blade tip and annulus surfaces (SRO):

SRO, Type A: The surfaces are arranged on the hub or casing contour of the annulus with firm connection to the blade, as in the case of platforms, shrouds, blisk and bling configurations, actually between the trailing edge plane HK and a plane situated 25 percent of the meridional chord length of the blade Cm before the leading edge plane VK.

SRO, Type B: The surfaces are arranged on the hub or casing contour of the annulus (10) in the area of free blade ends (above shroudless rotors or below shroudless stators) between the trailing edge plane HK and a plane situated 25 percent of the meridional chord length of the blade Cm before the leading edge plane VK.

SRO, Type C: The surfaces are arranged on blades at their free ends facing the hub or casing contour of the annulus 10 (tip end faces of the blade).

Figure 7:
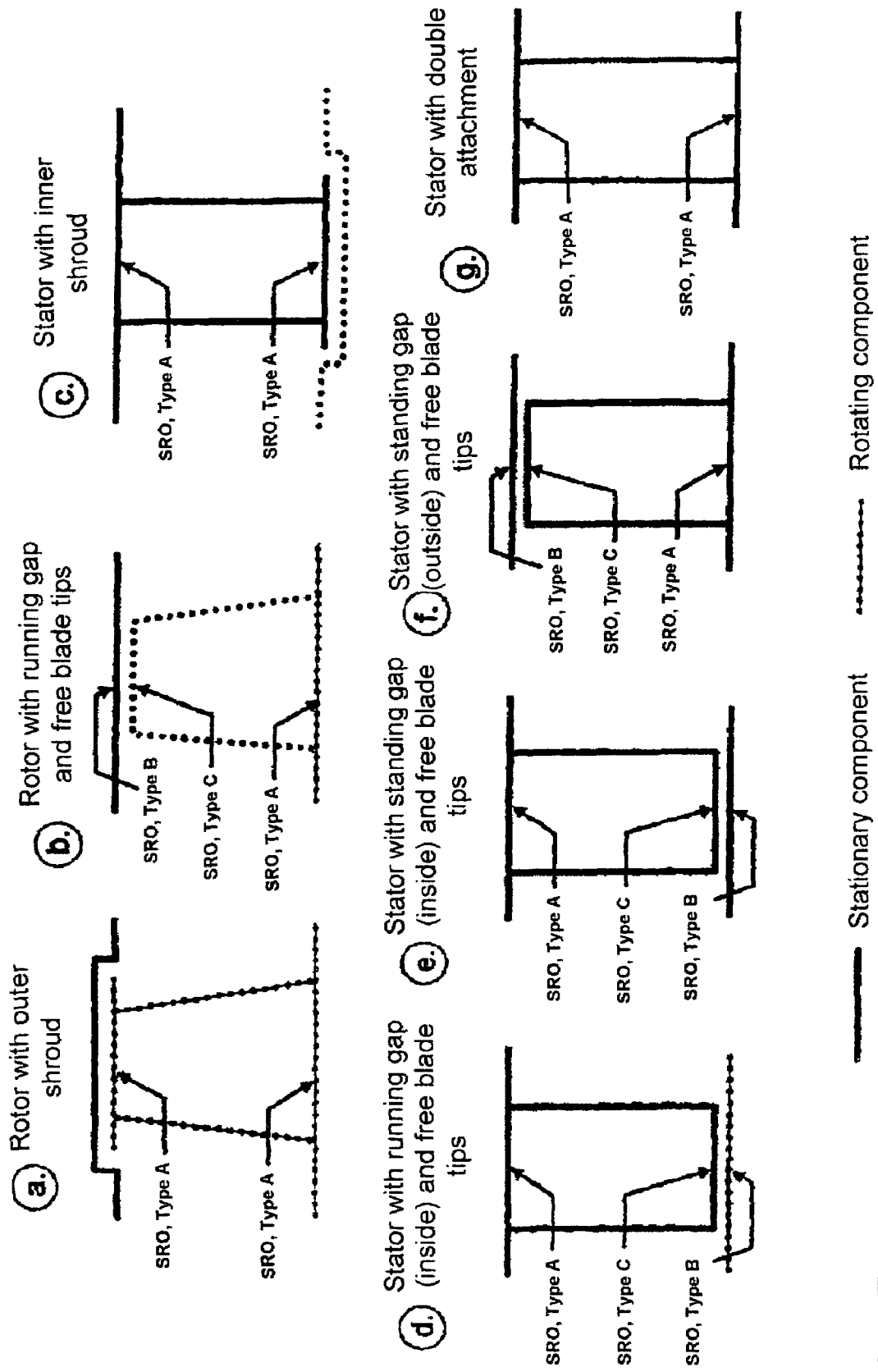
FIG. 7 is a further representation, regarding the definition of the term SRO in accordance with the present invention.

FIG. 7 shows various forms of blade rows of the turbomachine according to the present invention, with identification of the recurrent elements SRO, Type A, Type B, Type C. Specifically, the examples show the following:

FIG. 7a shows an assembly, including a rotor drum with several rotor blades co-rotating with the drum, a shroud enclosing the rotor blades at the outer periphery and co-rotating with them, and a stationary casing enclosing the rotary components.

FIG. 7b shows a variant with an assembly, including a rotor drum, several rotor blades with free outer ends co-rotating with the drum, and a stationary casing enclosing the rotary components.

FIG. 7c shows an assembly, including a stationary outer casing, several stator blades connected to the outer casing, a shroud carried by the stator blades on the inner periphery, and a rotor drum rotating within the stationary components.

FIG. 7d shows an assembly, including a stationary outer casing, several stator blades with free inner ends connected to the outer casing and a rotor drum rotating within the stationary components.

FIG. 7e shows an assembly, including a stationary outer casing, several stator blades with free inner ends connected to the outer casing, and a stationary inner casing within the stator blade row.

FIG. 7f shows an assembly, including a stationary inner casing, several stator blades with free outer ends connected to the inner casing, and an outer casing enclosing the stator blade row.

FIG. 7g illustrates an assembly including a stationary inner and outer casing and several stator blades connected to the inner and outer casing.

In accordance with the present invention, the removed fluid is routed via flow paths on the periphery of the annulus or within blades and their surrounding components. According to the present invention, the fluid is removed from the annulus in the area of the respective blade row either in free flow or by means of at least one restrictor element, which can be fixed or variable, situated in the flow path. The objective of this removal of fluid is to completely discharge the fluid from the turbomachine or from the overall system including the turbomachine (transport system, gas turbine or engine) or to return the fluid to the annulus of the turbomachine or the overall system.

In accordance with the present invention, the required elements of the flow path can have the form of a simple cavity, an annulus, a tube, duct, nozzle or diffuser of any cross-sectional shape and are, in accordance with the present invention, hereinafter summarized under the term "chamber".

Figure 8:
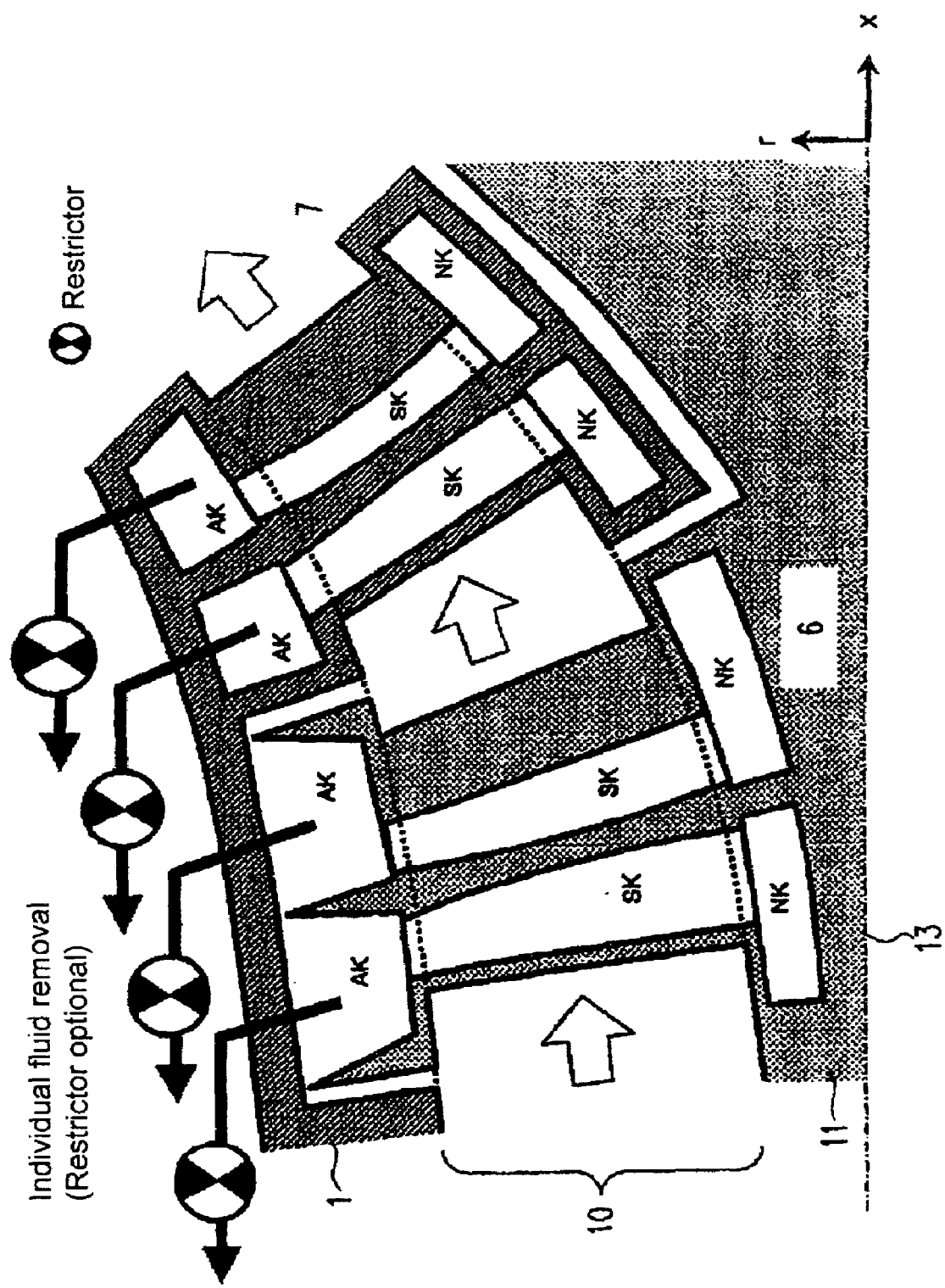
FIGS. 8 to 10 show different embodiments of chambers for fluid removal, especially from the casing.
Figure 9:
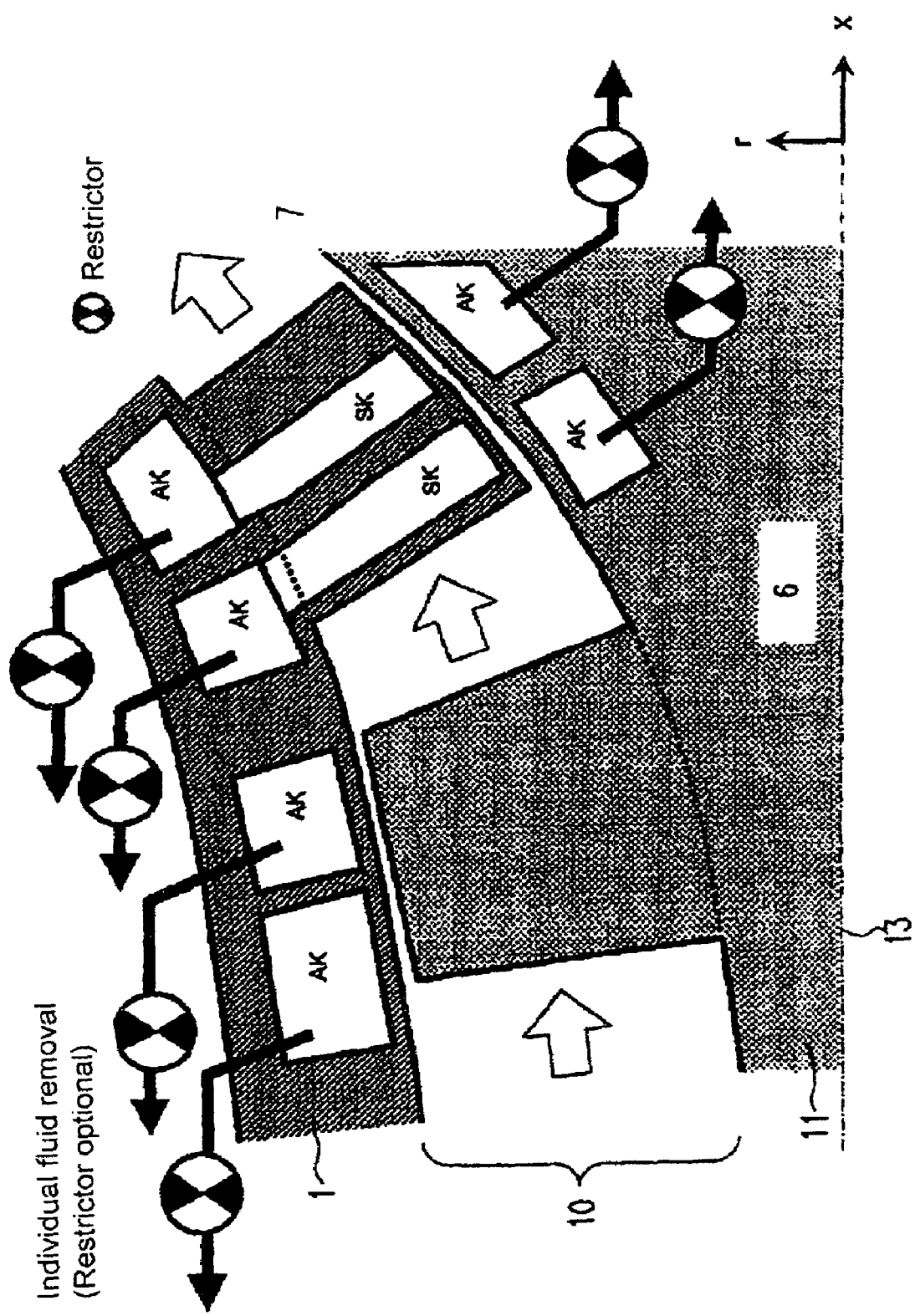
Figure 10:
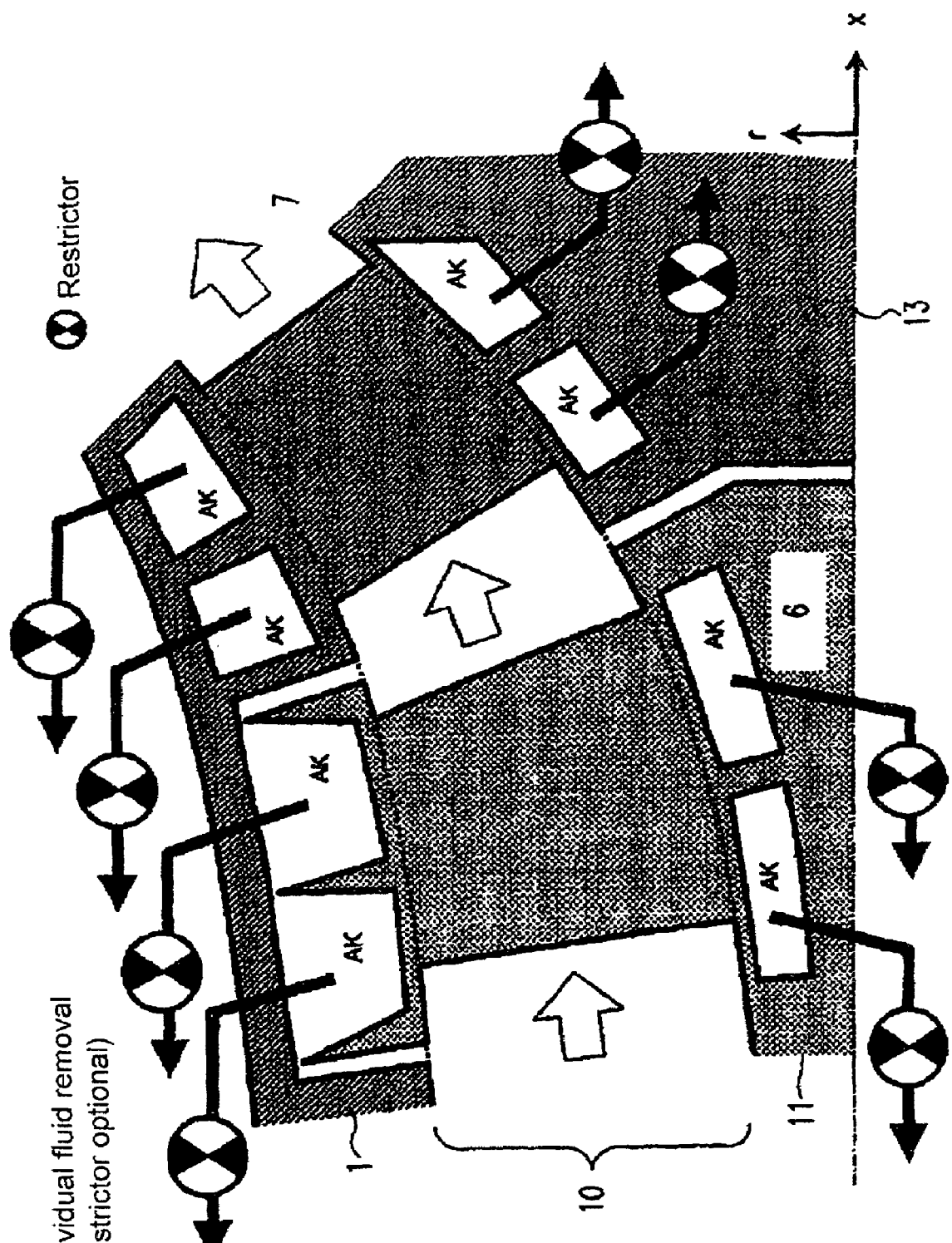

FIGS. 8 to 10 show various design variants of the present invention with configurations providing discharge chambers (AK), blade inner chambers (SK) and hub chambers (NK).

More particularly, FIGS. 8 to 10 show design variants in which at least one chamber on or in the casing is related to each of the individual blade rows by way of which fluid is removed from the blade row (discharge chamber AK). If at least one further chamber exists in the interior of at least one blade which extends totally or only partly over the blade height (blade inner chamber SK), each discharge chamber AK can be connected to at least one blade inner chamber SK to receive fluid from the latter. If the blade is firmly connected to the inner annulus contour, at least one chamber, which is the last chamber element of the total flow path designed for fluid removal, can exist on or in the hub outside the annulus (hub chamber NK), this chamber being connected to and supplying fluid to at least one blade inner chamber SK.

If the blade has a free end with radial gap on the hub or if the blade has no blade inner chamber extending over the entire blade height, at least one discharge chamber can exist on or in the hub outside the annulus for the removal of fluid on the hub.

Discharge chambers and hub chambers extend over the entirety or only parts of the machine circumference. The discharge chambers serve for the removal of fluid from the respective blade row, while the blade inner chambers and the hub chambers are means to provide access to the relevant blade tip and annulus surfaces (SRO) of the respective blade row.

Figure 11:
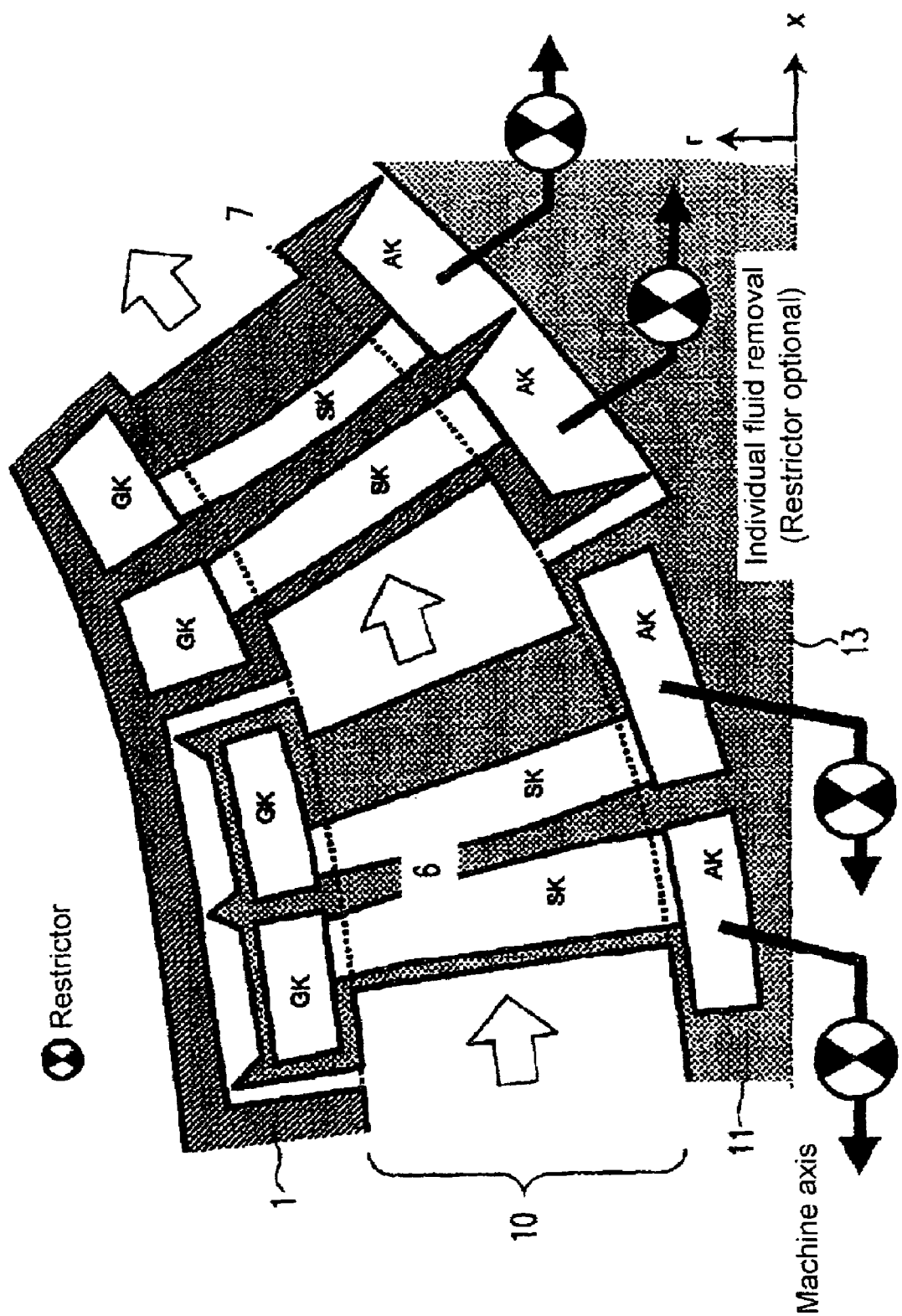
FIGS. 11 to 13 show embodiments analogically to FIGS. 8 to 10 with chambers for fluid removal, especially from the hub.
Figure 12:
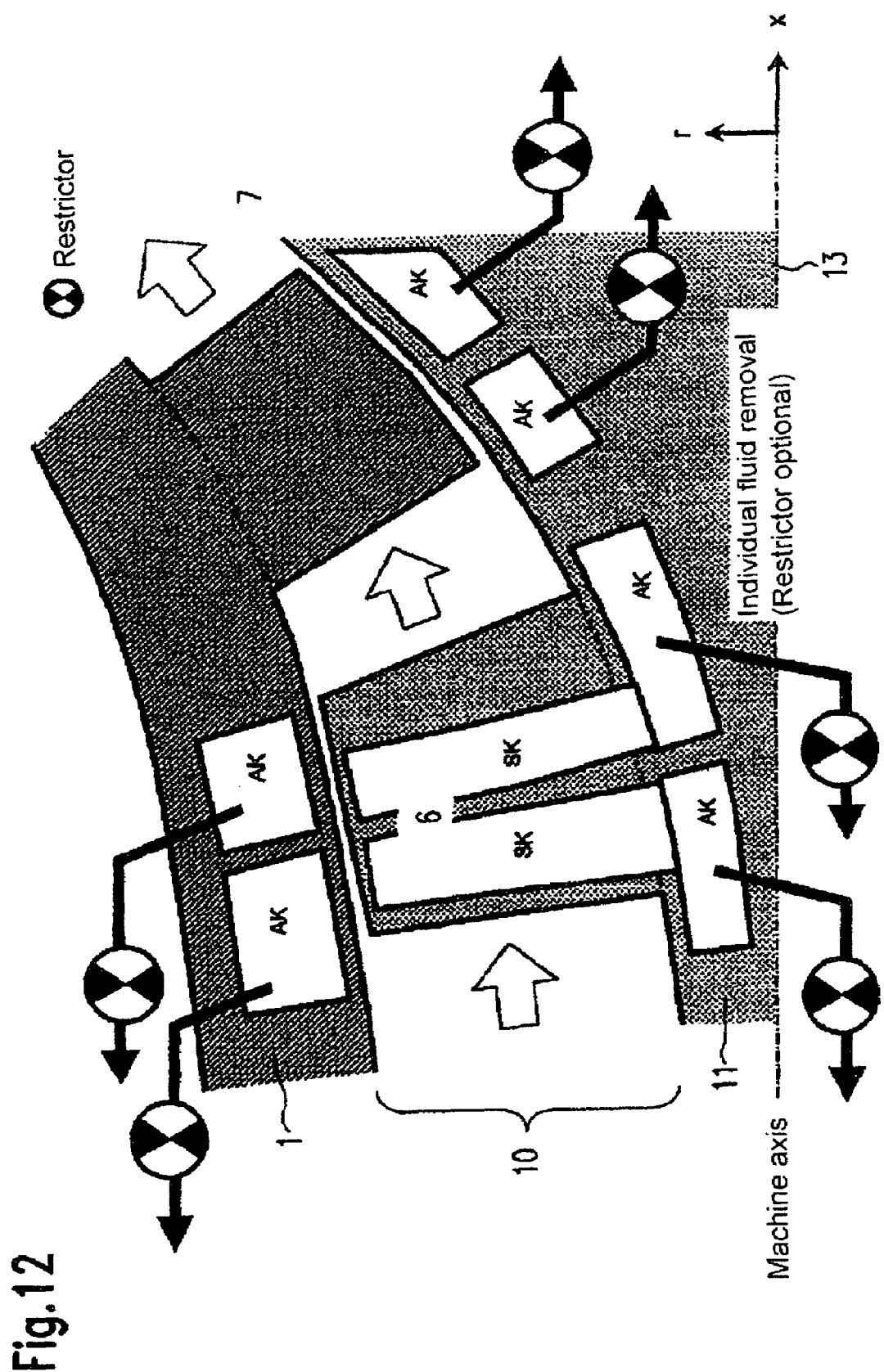
Figure 13:
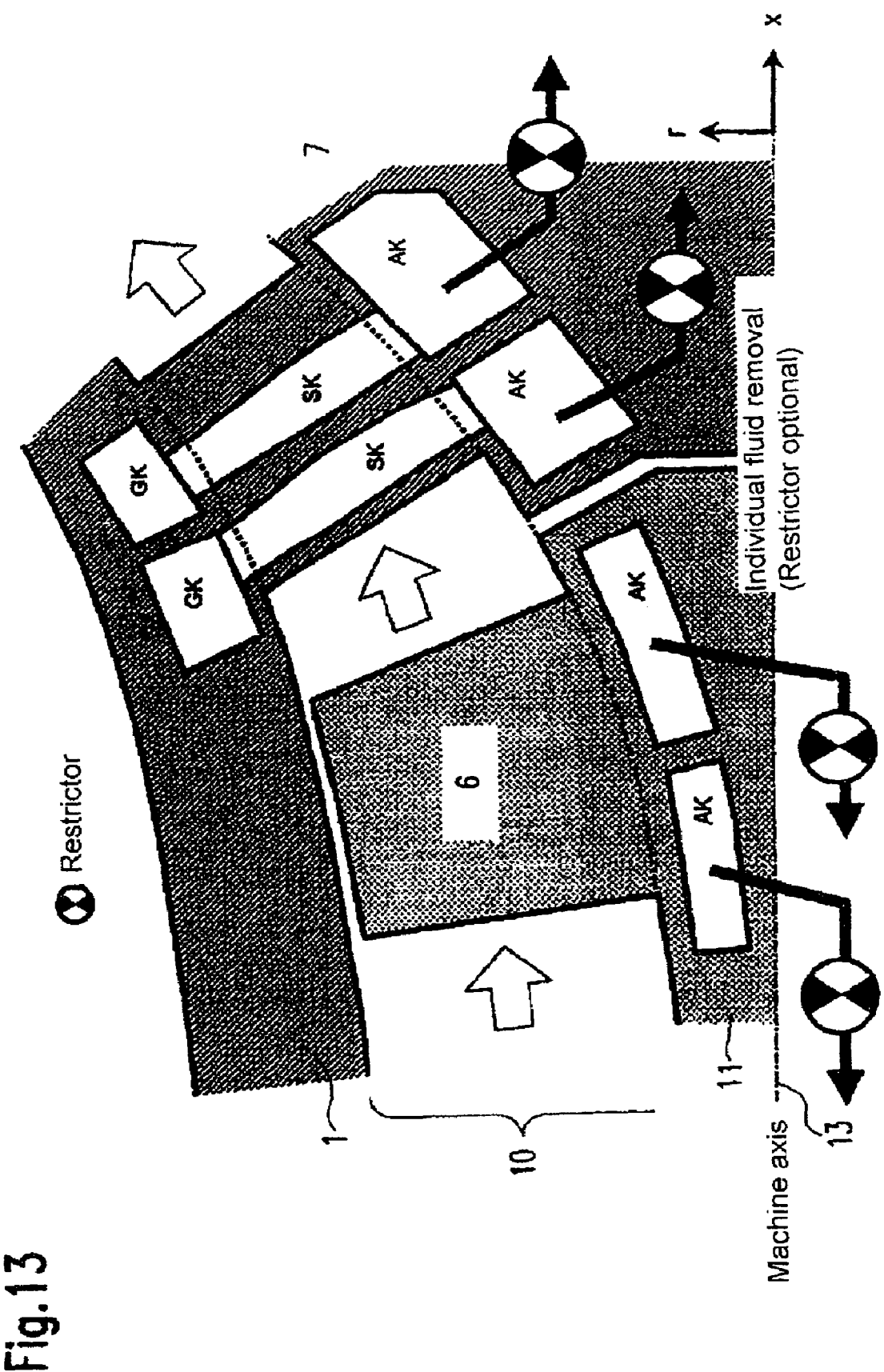
Figure 14:
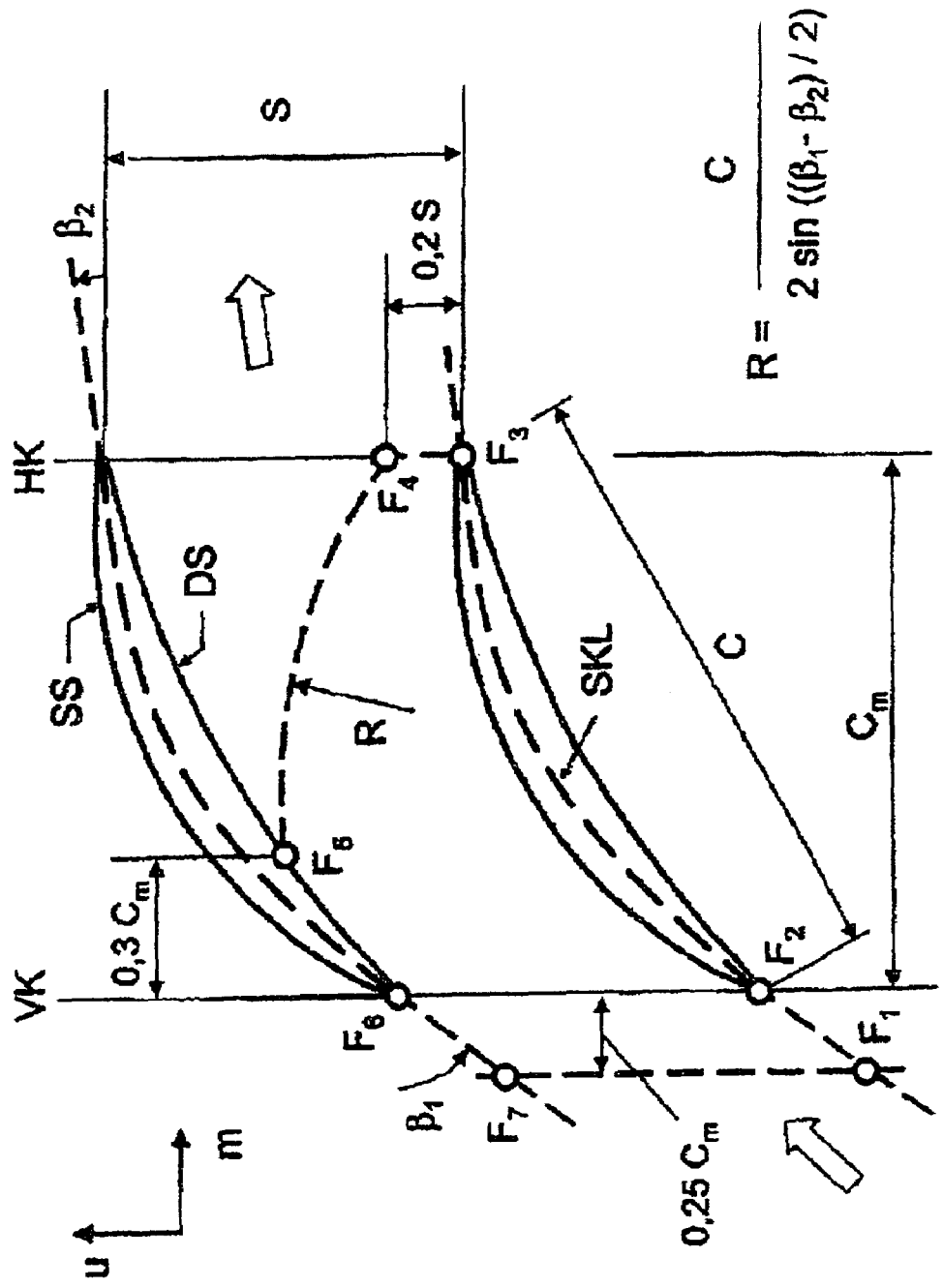
Figure 15:
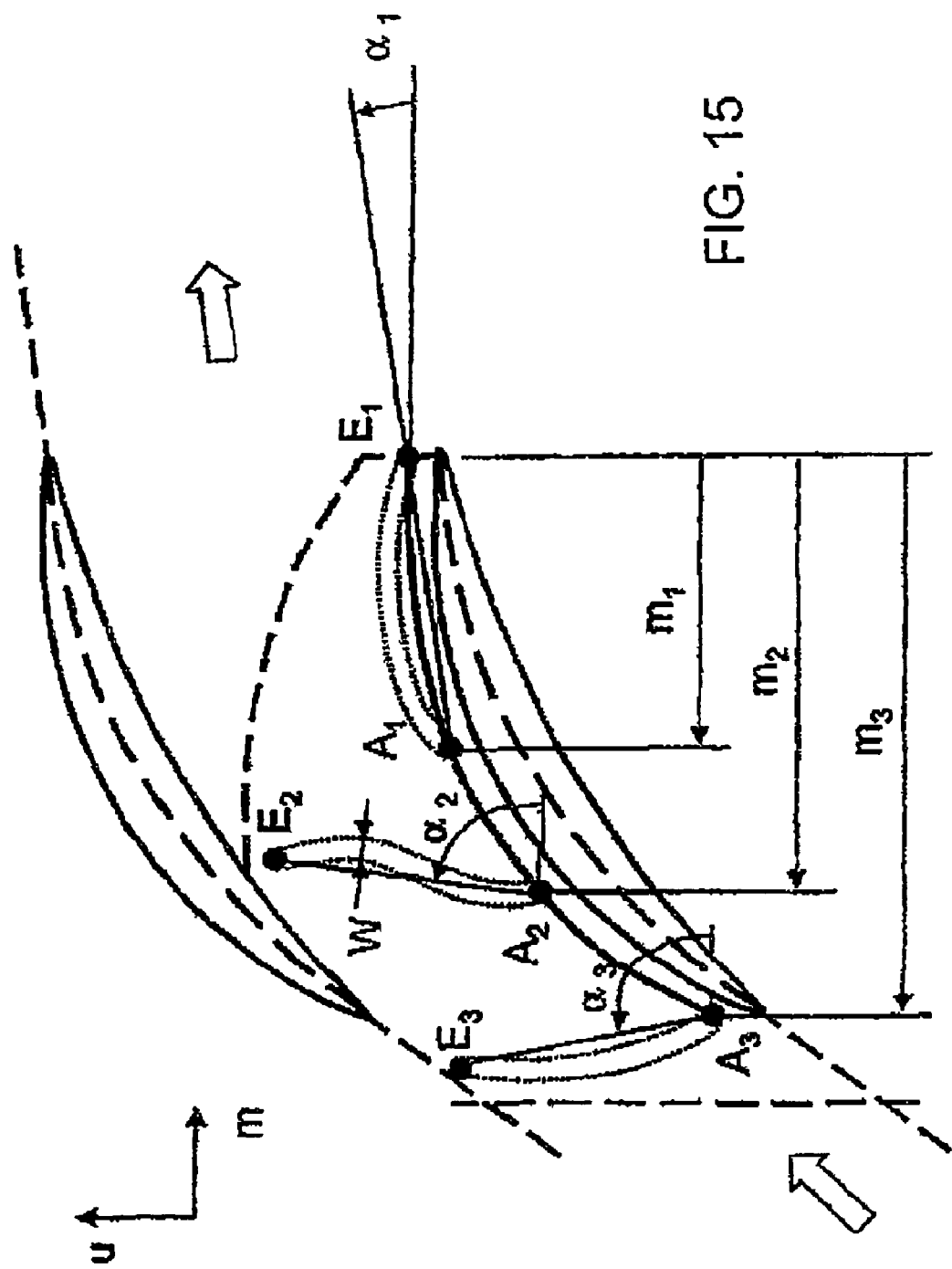

While FIGS. 8 to 10 show design variants in which at least one discharge chamber is arranged on or in the casing, FIGS. 11 to 13 present design variants in which at least one chamber is arranged on or in the hub by way of which fluid is removed from the blade row (discharge chamber AK). In case at least one further chamber exists in the interior of at least one blade which extends totally or only partly over the blade height (blade inner chamber SK), each discharge chamber AK can be connected to at least one blade inner chamber SK and receive fluid from the latter. If the blade is firmly connected to the outer annulus contour, at least one chamber, as the last chamber element of the total flow path designed for fluid removal, can exist on or in the casing outside the annulus (casing chamber GK), this chamber being connected to and supplying fluid to at least one blade inner chamber SK.

If the blade has a free end with radial gap on the casing or if the blade has no blade inner chamber SK extending over the entire blade height, also at least one discharge chamber can exist on or in the casing outside the annulus for the removal of fluid on the casing.

Discharge chambers and casing chambers extend over the entirety or only parts of the turbomachine circumference.

The discharge chambers serve for the removal of fluid from the respective blade row, while the blade inner chambers and the casing chambers are means to provide access to the relevant blade tip and annulus surfaces (SRO) in the area of the respective blade row.

According to the present invention, at least one fluid removal device is provided on at least one blade tip and annulus surface (SRO), on at least one blade of a blade row described in connection with the embodiments shown in FIGS. 8 to 10 or 11 to 13, respectively, and/or on least one of its annulus-limiting components, this fluid removal device connecting the blade tip and annulus surface (SRO) with a discharge chamber AK, a blade inner chamber SK, a hub chamber NK or a casing chamber GK. The fluid removal device is technically realized by mechanical, chemical or thermal methods of material removal on the component forming the blade tip and annulus surface (SRO).

In an alternative form of the present invention, the confines of the fluid removal device are provided by a combination of at least two pre-prepared components which are loosely or firmly joined.

Figure 17:
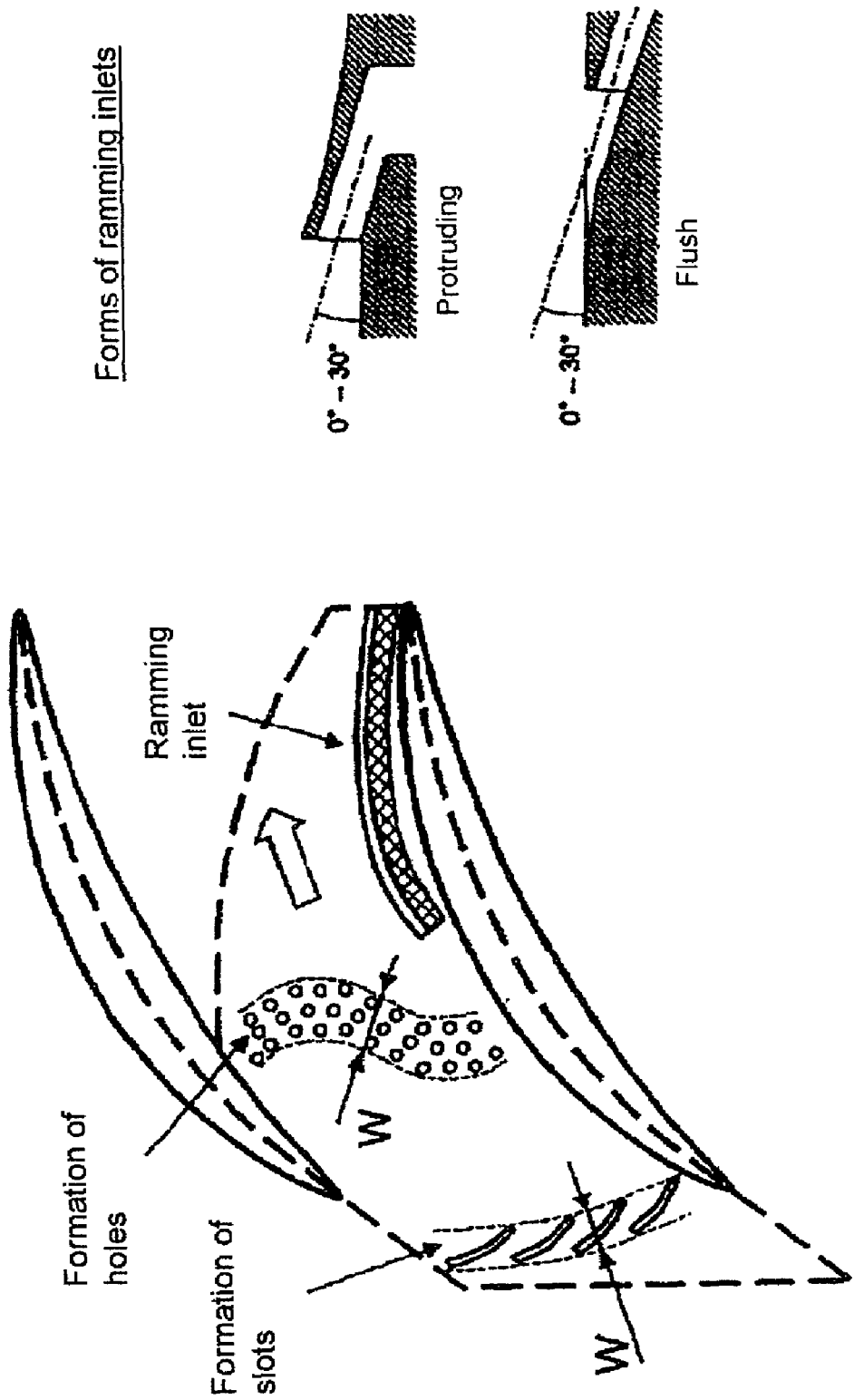

FIGS. 14 to 17 show inventive embodiments of the fluid removal device on blade tip and annulus surfaces (SRO) of the type A (FIG. 14), exemplified for the case N=3 (FIG. 15) and exemplified for the case N=3 (three slots or substitutes), see FIGS. 16 and 17.

The embodiments of the fluid removal device on type A blade tip and annulus surfaces (SRO) in FIGS. 14 to 17 accordingly show configurations of slots or functionally similar substitutes in the forward part of the blade passage. Individual slots (or substitutes) can be allocated to different discharge, casing or hub chambers. This results in the following:

Regarding the annulus surface in the coordinate system (m, u) established by meridional flow line direction and circumferential direction, a configuration of slots is situated in a segment of the annulus wall which is enclosed by the curve trace F1-F2-F3-F4-F5-F6-F7-F1.

Chord F1-F2, as well as chord F6-F7, is a tangential extension of the profile skeleton line SKL against the flow direction. Chord F1-F7 lies 25 percent of the meridional profile chord length (0.25*Cm) before the leading edge plane. Chord F2-F3 is defined by the suction-side contour SS between leading edge VK and trailing edge HK. Chord F3-F4 extends in the trailing edge plane from the profile to a point at 20 percent of the exit-side blade pitch (0.2*S) in the direction of the pressure side of the adjacent profile. Chord F4-F5 is a circular arc whose radius R is established by the profile chord length C and the inlet and outlet angles beta 1 and beta 2 according to R=C/(2*sin((beta 1−beta 2)/2)). Chord F5-F6 is defined by a part of the pressure side contour DS between the leading edge VK and a point located at 30 percent of the meridional profile chord length in the blade passage.

A number of at least 2 slots (number N>1) establishes a special arrangement that is orientated approximately orthogonally to the expected extension of the boundary layer flow. The concept is based on a slot orientated along the suction side SS which extends to the trailing edge plane, but whose length decreases as the number of further slots increases. The closer the further slots are located to the entry of the blade passage, the more they are inclined against the meridional flow direction m. A start point, an end point and an angle notation for the auxiliary straight line from the start to the end point define all slots. The start points lie on a baseline which is defined by either the suction-side contour itself or a line orientated to the suction-side contour which, however, at no point is spaced from it by more than 20 percent of the exit-side blade pitch (0.2*S) in the circumferential direction u. The baseline and a meridional distance to the trailing edge plane define the position of all start points.

The meridional trailing edge distance m(i) of a start point A (i) of the slot with the number (i) is m(i)=(i+1)*Cm/(N+1). For m (i), a tolerance of ±0.1*Cm applies.

The angle of inclination of the auxiliary straight line between the start point A(i) and the end point E(i) of a slot with the number (i) is alpha(i)=alpha1+(i−1)*(110°−alpha1)/(N−1). Alpha1 is here defined by the fact that both, the start point and the end point of the slot with the number 1 lie on the baseline. For alpha (i), a tolerance of ±20° applies.

The extension of each slot is supported by the respective auxiliary straight line, but must agree with it only at the start and at the end point. All slots end within the boundaries of the annulus wall segment enclosed by the curve trace F1-F2-F3-F4-F5-F6-F7-F1.

They extend straight, simply or multiply curved between the start and the end point. They have a constant width or a longitudinally variable width which, however, is always less than 10 percent of the exit-side blade pitch (W<0.1*S). They have square, chamfered or rounded surface edges. They are square or have a round (oblong-hole style) termination at the start and at the end point. The slots extend vertically or obliquely to the annulus surface, through the wall material, into a discharge chamber AK, a hub chamber NK or a casing chamber GK.

In a modified form—with the same provisions applying to the positioning and the extension on the annulus surface as well as the condition of the surface edges and the orientation in the annulus wall—at least one slot is replaced by a formation of several, straight or curved slots with a maximum width W of the slot configuration of 15 percent of the exit-side blade pitch (W<0.15*S).

In another modified form—with the same provisions applying to the positioning and the extension on the annulus surface as well as the condition of the surface edges and the orientation in the annulus wall—at least one slot is replaced by a formation of single or multiple-row holes with a maximum width W of the hole configuration of 15 percent of the exit-side blade pitch (W<0.15*S).

In another modified form—with the same provisions applying to the positioning and the extension on the annulus surface—at least one slot is designed as ramming inlet, characterized in that fluid is discharged to the annulus surface at an angle of max. 30°.

In still another modified form—with the same provisions applying to the positioning and the extension on the annulus surface as well as the condition of the surface edges and the orientation in the annulus wall—at least one of the N elements (slot, slot formation, hole formation or ramming inlet) is omitted.

FIGS. 18 to 21 show embodiments of the fluid removal device on blade tip and annulus surfaces (SRO) of the type B on which a configuration of slots or functionally similar substitutes is provided in the forward part of the free blade end. Individual slots (or substitutes) of the configuration can be allocated to different discharge chambers. The form of the fluid removal device according to the present invention specified herein shall, however, not be confused with the forms of casing structuring or casing treatment described elsewhere since, in accordance with the present invention, the relevant point is the local removal of fluid, not a pulsating exchange of fluid between the slot space and the annulus space.

Figure 18:
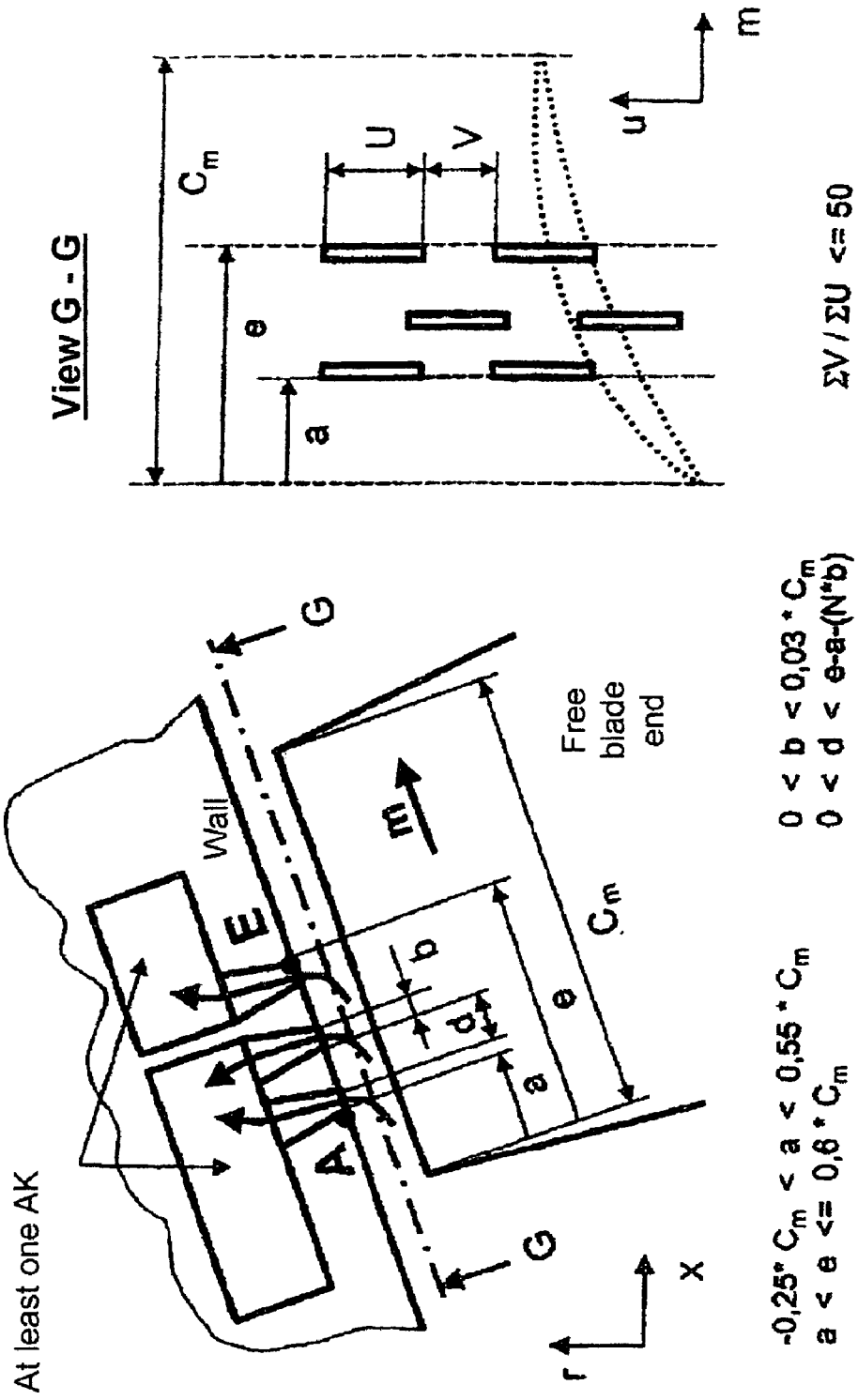
Figure 21:
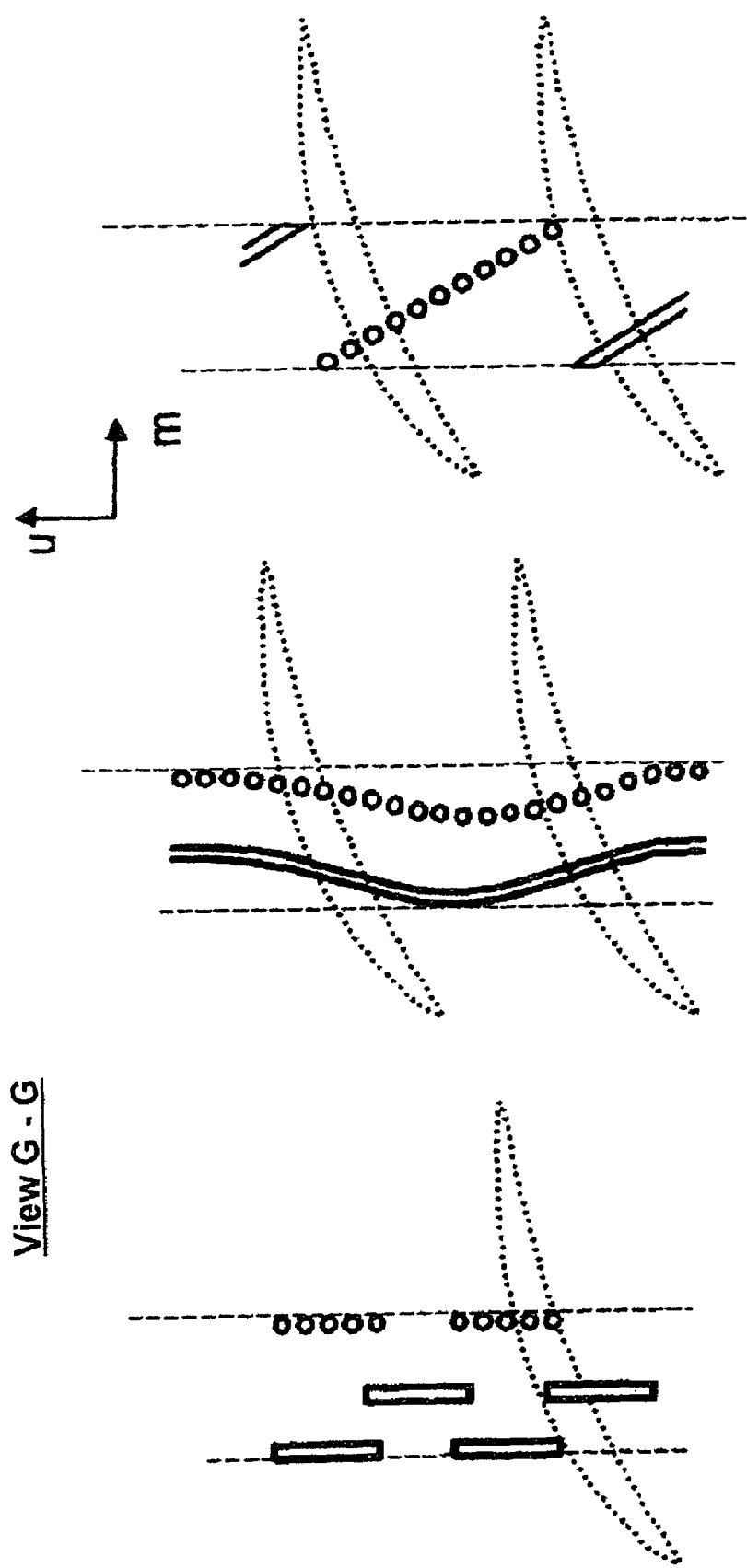

FIG. 18 shows a fluid removal device on blade tip and annulus surfaces (SRO) of the type B with circumferential slot arrangement, exemplified for the case N=3. FIG. 19 illustrates a fluid removal device of the type B with curvilinear slot arrangement, exemplified for the case N=2. FIG. 20 shows a fluid removal device of the type B with staggered slot arrangement, while FIG. 21 illustrates a variant of a fluid removal device of the type B in which a slot is replaced by hole rows.

Specifically, FIGS. 18 to 21 show the following details of the inventive solution:

Considering the blade row in the coordinate system (x,r) established by axial direction and radial direction, a configuration of N slots (N>=1) is located in a section of the annulus wall that is confined by the start point A and the end point E in the meridional direction. Start point A lies at a meridional distance a from the blade leading edge considered at the blade end. The distance a can extend over max. 25 percent of the meridional chord length Cm before the leading edge and over max. 55 percent of the meridional chord length Cm behind of the leading edge (−0.25*Cm<=a<=0.55*Cm). The end point E is located at a meridional distance e from the blade leading edge considered at the blade end. Distance e is larger than distance a and may extend behind the leading edge over max. 60 percent of the meridional chord length Cm (a<e<=0.6*Cm).

The slots have the width b, which may vary between 0 and 3 percent of the meridional chord length Cm. The following applies for the distance d by which the slots are separated from each other: 0<d<e−a−(N*b). The extension of a slot may be interrupted in the circumferential direction u by a certain amount. This applies to slots that extend purely circumferentially and to slots that extend obliquely (i.e. with a meridional direction component). The circumferential length V of individual interruptions and the circumferential length U of individual, remaining slot sections can vary along the extension of the slot, but the sums of the remaining slot lengths and of the interruption lengths must have a relation of less than 50 (total U/total V<50). The slots have square, chamfered or rounded surface edges. They are square or have a round (oblong-hole style) termination at their ends. The slots extend vertically or obliquely to the annulus surface, through the wall material, into a discharge chamber AK, during which they take a straight or curved course. FIG. 18 shows the case of N=3 interrupted slots with purely circumferential orientation.

In a special form, cf. FIG. 19, the location of the slots in meridional flow direction changes periodically along the circumference. The distance F between two adjacent positions, at which the slot (including any interruption sections according to the above specification) has the same meridional coordinate, is here defined by the blade pitch S measured at the blade end and the circumferential length established with the circular constant PI and the end point radius RE (0.2*S<F<=2*PI*RE). This includes, in particular, a slot configuration in which the extension (circumferential and meridional coordinate) of individual slots, including their interruption sections, is defined by an oblique conic section through the casing or hub contour, respectively.

In another special form, cf. FIG. 20, the extension of the slot is interrupted periodically and the slot sections are staggered. In the plane established by the meridional and the circumferential directions, the slot sections are inclined against the meridional flow direction by the angle beta, which may range between 30° and 90° (30°<beta<90°). Here, the slot section need not be straight, but can be simply or multiply curved. The pitch K between two slot sections is defined by the blade pitch S measured at the blade end and the circumferential length calculated from the circular constant PI and the end point radius RE (0.2*S<K<=2*PI*RE). As viewed in the meridional plane (x,r), the slot can be inclined against the meridional flow direction m by the angle alpha. Under specific conditions, a distinct torsioning of the slot may exist, as a result of which the range of alpha is partly or fully exhausted already along a section of the slot.

Alternatively, at least one slot section of the overall configuration may be replaced by a hole row, cf. FIG. 21. The hole diameter is subject to the same constraints as the slot width b.

Figure 22:
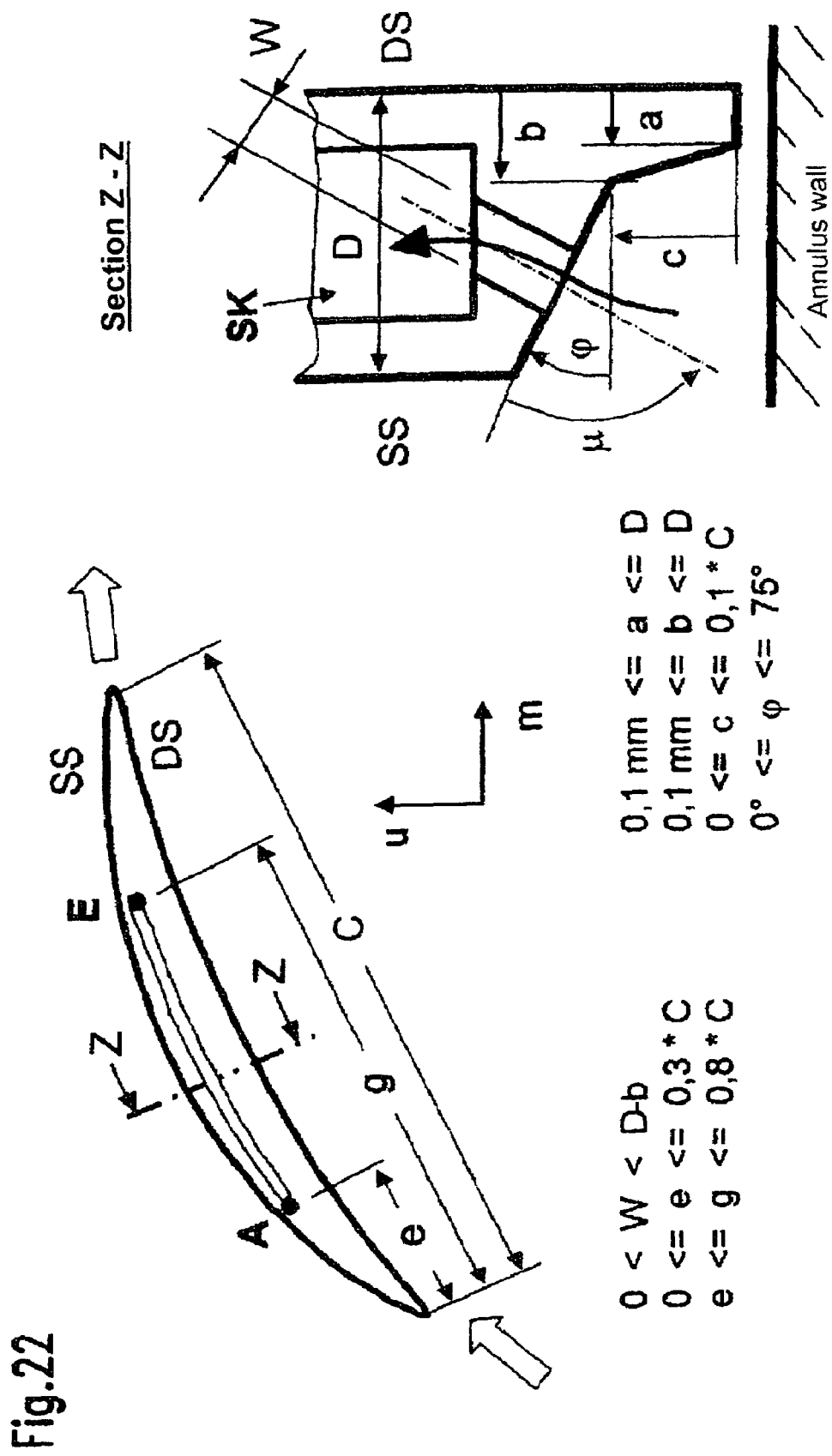
Figure 24:
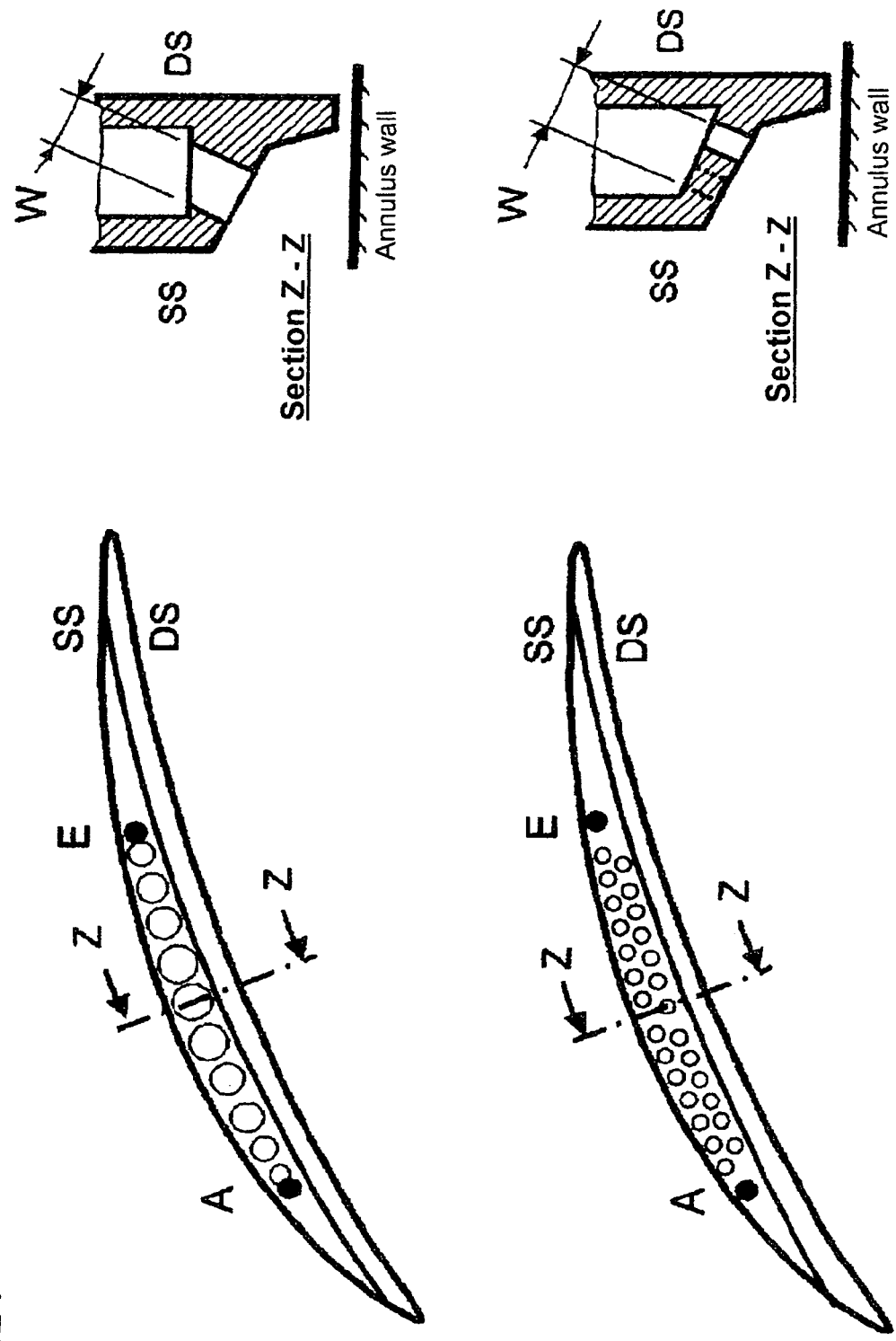

FIGS. 22 to 24 show examples of the inventive fluid removal device on blade tip and annulus surfaces (SRO) of the type C on which slots or functionally similar substitutes are provided along the blade tip. Slots or substitutes can be allocated to different blade chambers.

FIG. 22 here shows a fluid removal device on a blade tip and annulus surface (SRO) of the type C with at least one slot or substitutes. Further variants are illustrated in FIGS. 23 and 24.

Reference is made to the tip of a blade in the coordinate system (m,u) established by the meridional flow direction and the circumferential direction, cf. FIG. 22. The blade tip is designed either conventionally (approximately rectangular) or provided with a step whose specific form is defined by the quantities a, b, c and phi. The step frontal width a is at least one-tenth millimeter and not more than the size of the local profile thickness D (0.1 mm<=a<=D). The step bottom width b is at least one-tenth millimeter and not more than the size of the local profile thickness D (0.1 mm<=b<=D). The step depth c is up to 10 percent of the profile chord length (0<=c<=0.1*C). The step inclination angle, measured against the annulus wall, will range between 0° and 75° (0°<=phi<=75°). The quantities a, b, c and phi may change within the specified limits, depending on the profile depth considered.

On the front of the blade tip, N slots (N>=1) are provided which extend side by side along the profile. The start point A of the slot arrangement lies between the leading edge VK and a profile depth of 30 percent of the chord length C.

The end point E lies between the start point A and a profile depth of 80 percent of the profile chord length C. The width W of the slot arrangement is variable and assumes as max. value the profile thickness D reduced by the step bottom width b, as applicable for the respective profile depth (0<W<D−b). The slots have square, chamfered or rounded surface edges. They are square or have a round (oblong-hole style) termination at the start and end point. The slots extend vertically or obliquely to the blade tip surface through the wall material into a blade chamber SK.

In a modified form—with the same provisions applying to the positioning and the extension on the blade tip as well as the condition of the surface edges and the orientation in the blade tip wall—at least one slot is replaced by a formation of several, straight or curved slots with a maximum width W of the slot configuration of 0<W<D−b.

In a modified form—with the same provisions applying to the positioning and the extension along the blade tip as well as the condition of the surface edges and the orientation in the blade tip wall—at least one slot is replaced by a formation of several holes.

Figure 25:
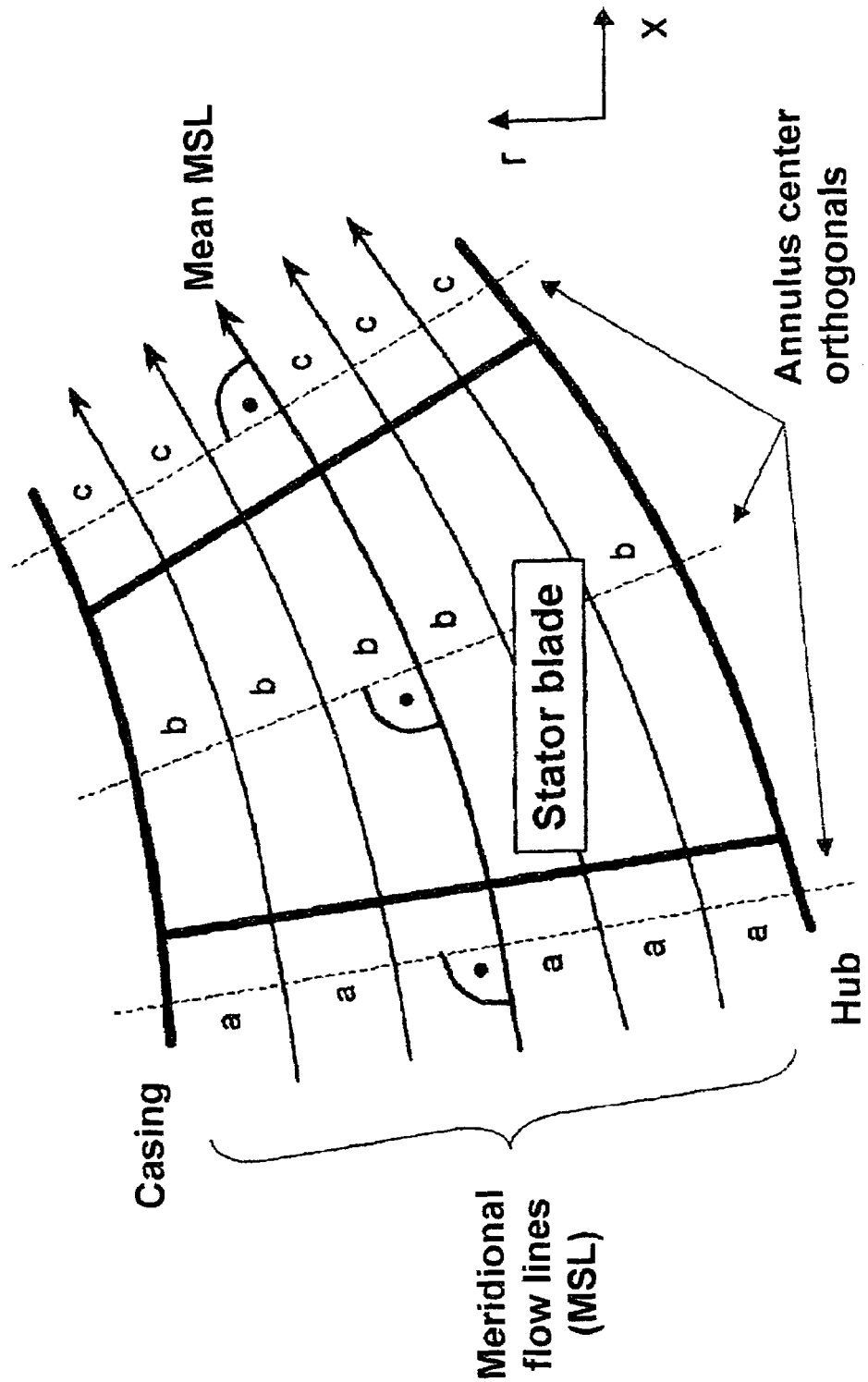
FIGS. 25 to 27 show devices for suction-side, intensity-variable fluid removal (SIFE) in accordance with the present invention.
Figure 26:
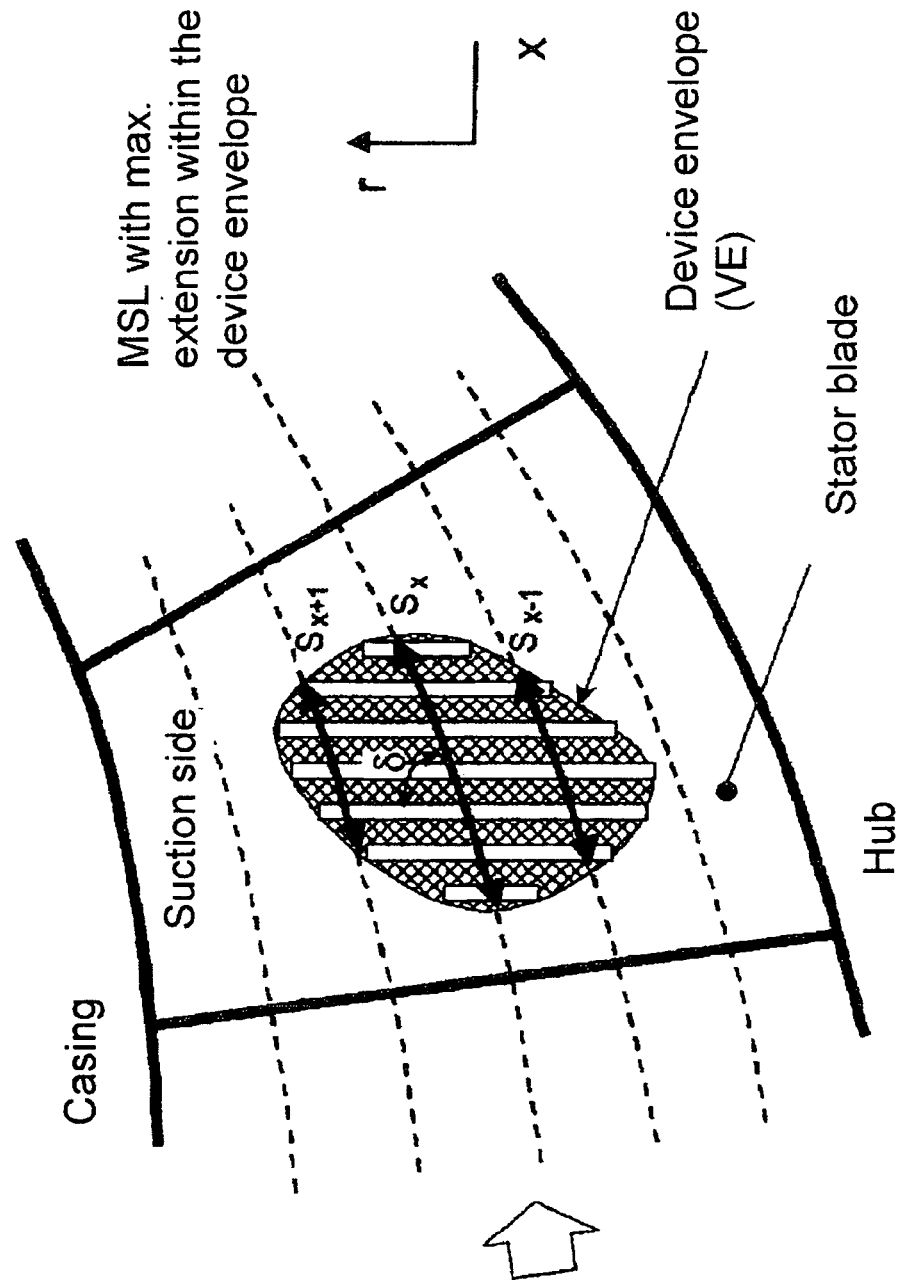
Figure 27:
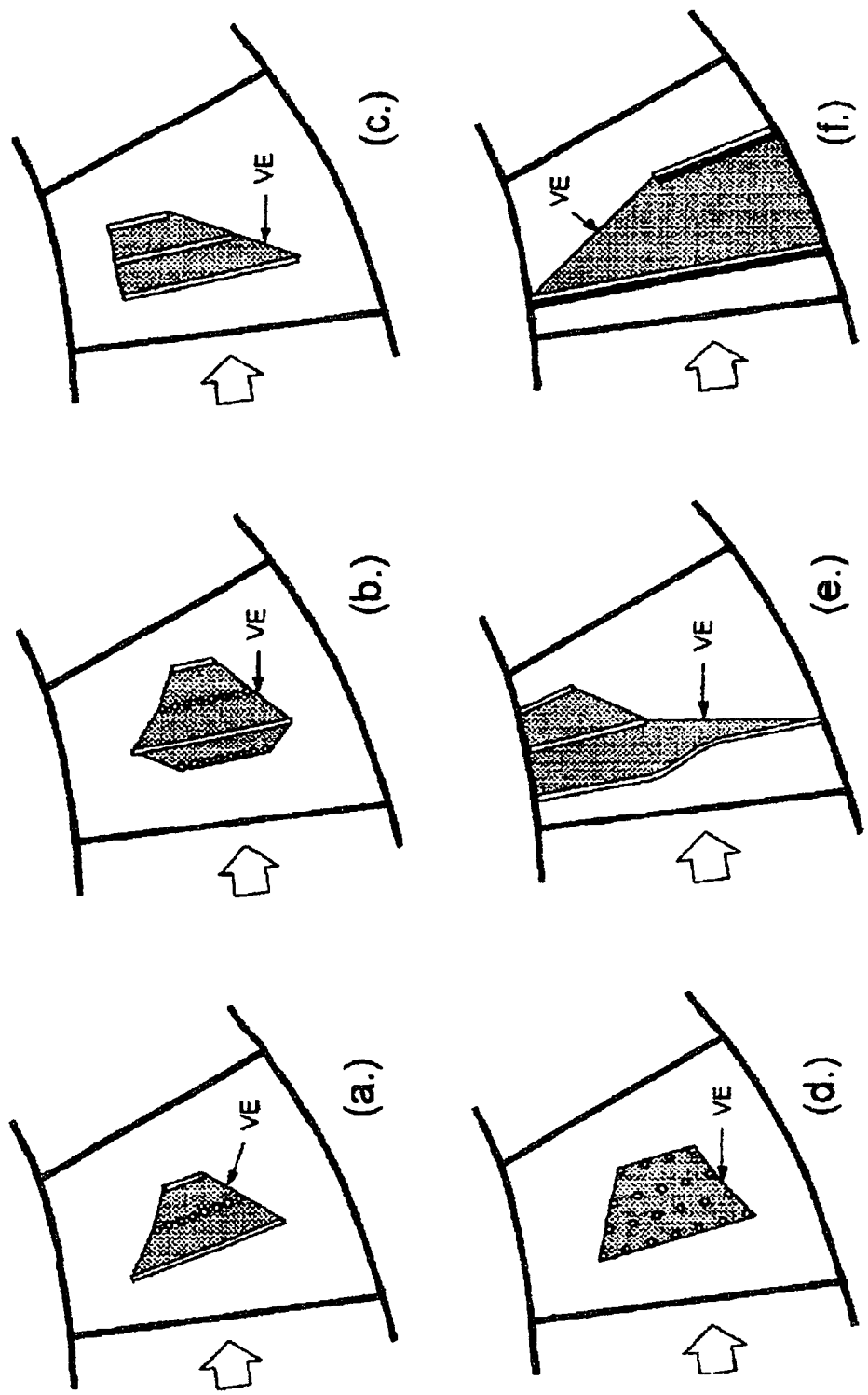

FIGS. 25 to 27 show examples of the inventive device for suction-side, intensity-variable fluid removal (SIFE) on a stator row. Here, a formation of slots or functionally similar substitutes, respectively, is provided in aerodynamically critical zones on the blade suction side providing for variable intensity of fluid removal in meridional flow line-orthogonal direction.

Fluid removal is accomplished by a number of openings which can be allocated to different blade inner chambers.

As illustrated in FIG. 25, the following details apply:

Reference is made to a stator blade row of the turbomachine in the coordinate system (x,r) established by axial direction and radial direction. The definition of the device for suction-side, intensity-variable fluid removal (SIFE) orientates by a number of meridional flow lines whose supporting points are established by an equidistant division of the annulus center orthogonal between hub and casing. This is exemplified in FIG. 25 for one annulus center orthogonal before (see equal chords a), one within (see equal chords b) and one behind (see equal chords c) the blade row.

FIG. 26 shows an embodiment of the device for suction-side, intensity-variable fluid removal (SIFE) according to the present invention. The device comprises a combination of at least two openings (N>=2) provided within a partial area of the suction side of at least one blade of a stator row. The suction-side zone occupied by the device is defined by the envelope around all openings belonging to the combination (device envelope VE). The device is designed such that the maximum meridional extension s(x) is along a certain meridional flow line. In accordance with the present invention, the transition to adjacent meridional flow lines results in a meridional extension decreasing stepwise or continually in the direction of the casing and in the direction of the hub. Consequently, the following applies from flow line to flow line:

$$S(x) >= S(x+1) >= \ldots >= S(x+n) \text{ and/or } S(x) >= S(x-1) >= \ldots >= S(x-n).$$

In the representation chosen, the device includes a number of straight, parallel slots. However, each slot can be simply or multiply curved, have a constant or longitudinally varying width and a square or round (oblong-hole style) termination at the start and at the end point. Any inclination angle delta may exist between slot and meridional flow line. The slots extend vertically or obliquely to the suction-side surface through the wall material into a blade inner chamber SK.

In a modified form—with the same provisions applying to the positioning and the extension on the suction-side surface as well as the condition of the surface edges and the orientation in the suction-side wall—at least one slot is replaced by a single or multi-row hole formation.

In another modified form—with the same provisions applying to the positioning and the extension on the suction-side surface—at least one slot is designed as ramming inlet, characterized in that fluid is discharged to the suction-side surface at an angle of not more than 30° (see representation on the right-hand side in FIG. 17).

FIG. 27 shows different variants of a device for suction-side, intensity-variable fluid removal (SIFE). Specifically, the examples show the following:

FIG. 27a shows a stator assembly, which features a formation of 2 slots and one hole row on the suction side to effect the meridional, flow line-orthogonal variation of the fluid removal intensity in accordance with the present invention. According to the present invention, the device covers only part of the suction side and, in this example, is located in the central area. The combination of slots and holes is enclosed and identified by the device envelope VE. As can be seen, the meridional extension of the device here decreases continually in both, the direction of the casing and the direction of the hub.

FIG. 27b shows a modification of the stator assembly of FIG. 27a in accordance with the present invention, in which the slot and hole elements are arranged in a different sequence and the number of elements is increased.

FIG. 27c shows a stator assembly in accordance with the present invention which features a formation of 3 slots on the suction side. The device in this example of application is primarily orientated towards the casing. The combination of openings is enclosed and identified by the device envelope VE. Here, as illustrated, the meridional extension of the device decreases stepwise to zero in the direction of the casing and continually in the direction of the hub.

FIG. 27d shows a stator assembly which features a formation of holes on the suction side. The device in this example of application is located in the central area of the suction side. The device envelope indicates that in this example of application the meridional extension of the device decreases continually in both, the direction of the casing and the direction of the hub.

FIG. 27e shows a stator assembly which features a formation of 3 slots on the suction side. The device in this example of application is located on the casing. The device envelope indicates that the meridional extension of the device decreases continually in the direction of the hub.

FIG. 27f shows a stator assembly which features a formation of 2 ramming inlets on the suction side. The device in this example of application is located on the hub. The device envelope indicates that the meridional extension of the device decreases continually in the direction of the casing.

Finally, a particularly high degree of flow influencing can be obtained if one or more of the solutions for fluid removal according to the present invention are combined with measures for fluid supply in the area of the same blade row.

In this case, according to the present invention, both, a chamber system for fluid removal and subsequent discharge from the blade side into an area outside the annulus and a chamber system, which is not further to be defined, for the supply of fluid to the blade side and subsequent issue into the annulus on surfaces in the area before or within this blade row exist on at least one blade row of the turbomachine.

Fluid removal and fluid supply are here combined on one and the same blade of a rotor or stator, or are provided on different blades of the same rotor or stator row.

Figure 28:
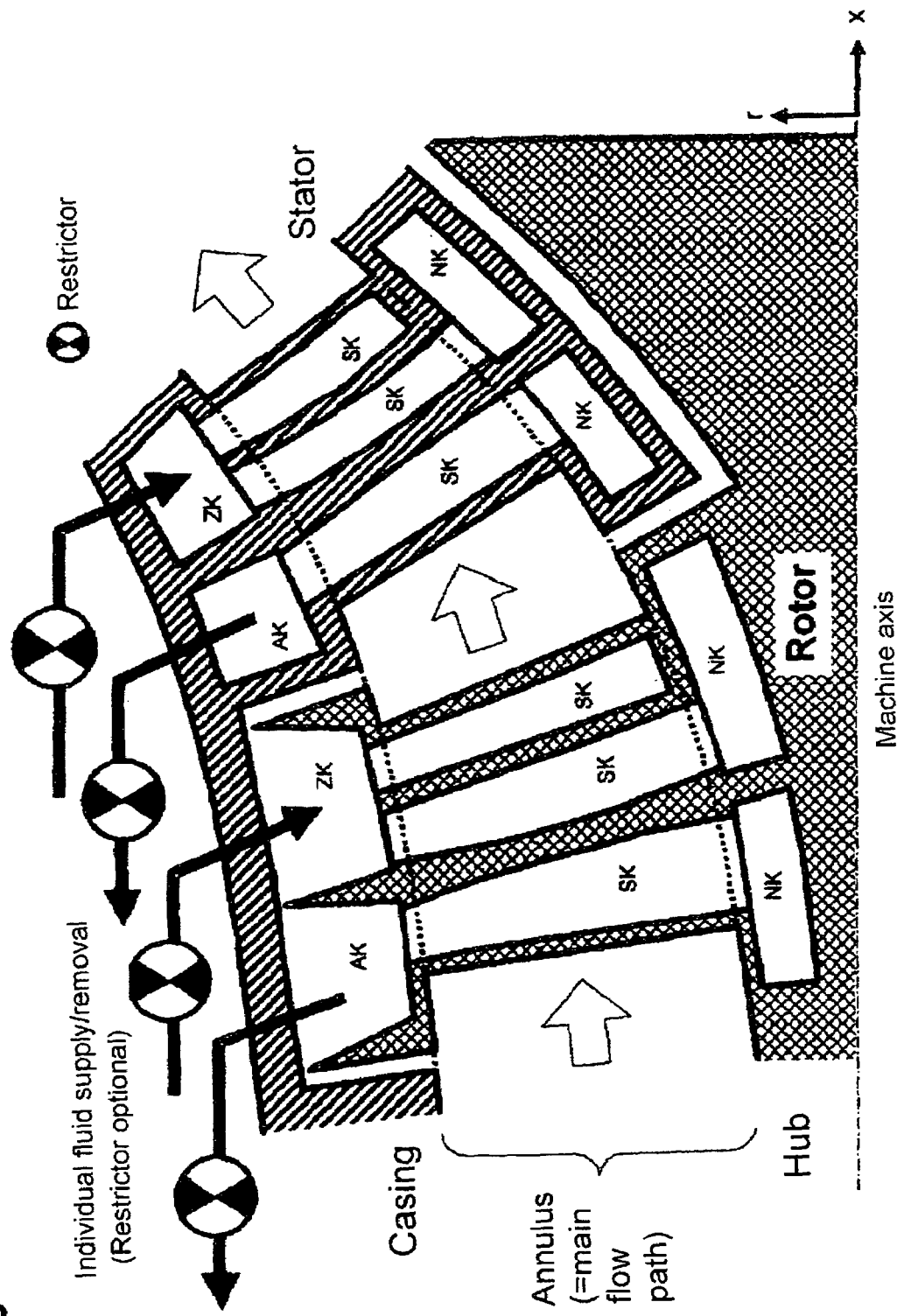
FIGS. 28 to 29 show different embodiments of chambers for simultaneous removal and supply of fluid on the same blade row (bi-functionality).
Figure 29:
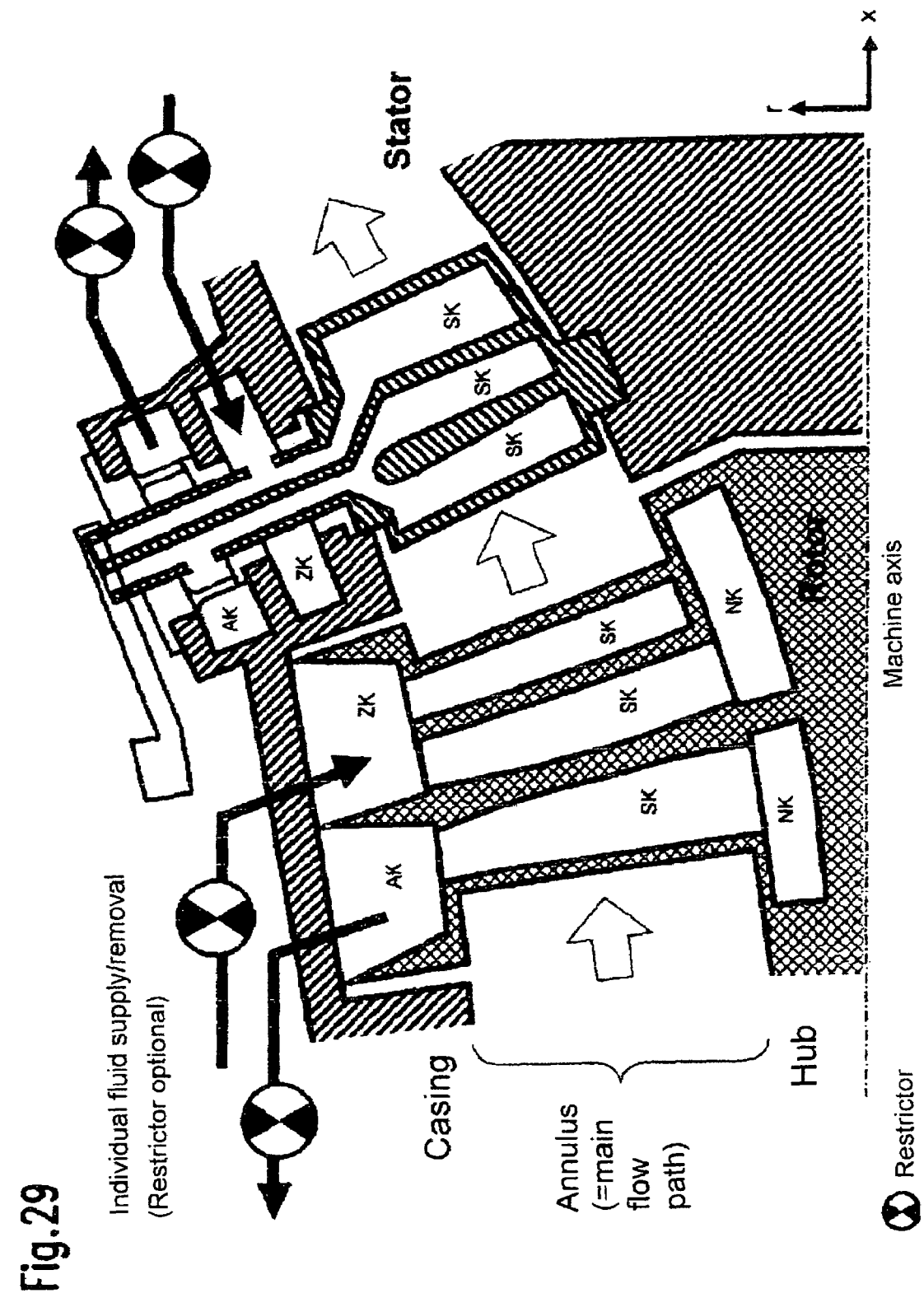

FIGS. 28 and 29 exemplify some possible variants of blade sides with corresponding bi-functionality on the same blade.

Summarizing, then, the turbomachine according to the present invention provides for a so far unequalled degree of boundary layer influencing. This can be obtained with the most different types of turbomachinery, such as blowers, compressors, pumps and fans as well as aircraft and ship propellers. Depending on the variant, the present invention provides for an aerodynamic load and a flow deflection which outperform the values obtained in the state of the art by up to 50 percent. For declared performance values of a turbomachine, the number of components installed, as compared to a conventional design, can be reduced by approximately 30 percent, with efficiency being maintained or even improved by up to 1 percent. This entails a cost reduction by 10 to 15 percent. If a novel blade concept is used in the compressor of an aircraft engine with approx. 25,000 pound thrust, a reduction of the specific fuel consumption of up to 0.5 percent and a weight saving of approx. 5 percent is achieved according to the present invention.

LIST OF REFERENCE NUMERALS

1 Casing
2 Blade
3 Slot
4 Slot
5 Stator
6 Rotor
7 Stator
8 Rotor blade
9 Stator blade
10 Annulus
11 Rotor drum (hub)
12 Rotor drum (hub)
13 Machine axis

What is claimed is:

1. A turbomachine comprising:
at least one rotor, with the rotor comprising several rotor blades attached to a rotating shaft,
a casing which is passed by a fluid flowing through the rotor,
means for removal of the fluid provided at at least one blade of a blade row of the rotor on aerodynamically critical locations on at least one of a blade tip and annulus surfaces, wherein the at least one of the blade tip and annulus surfaces are provided in the form of at least one of surfaces on a hub and casing contours of the annulus, in an area of free blade ends, between a trailing edge plane HK and a plane which is located 25 percent of a meridional chord length Cm before a leading edge plane VK, the means for removal of the fluid being arranged on the annulus surfaces in a circumferentially non-uniform pattern, said pattern repeating in the circumferential direction.

2. A turbomachine in accordance with claim 1, comprising:
at least one stator equipped with stationary stator blades which is passed by the fluid, wherein the means for removal of the fluid are also provided at at least one stator blade on aerodynamically critical locations on at least one of a blade tip and annulus surfaces.

3. A turbomachine in accordance with claim 2, comprising at least one arrangement for suction-side, intensity-variable fluid removal on at least one blade of a blade row of the stator.

4. A turbomachine in accordance with claim 2, comprising: means for removal of the fluid provided on at least one blade of a stator row, which means are distributed on a blade suction side over a defined area in a meridional flow direction.

5. A turbomachine in accordance with claim 4, wherein the means for removal of the fluid are arranged such that a meridional extension thereof in meridional flow line-orthogonal direction decreases towards at least one of wall of the annulus.

6. A turbomachine in accordance with claim 5, wherein the fluid is discharged via flow paths on a periphery of the annulus.

7. A turbomachine in accordance with claim 5, wherein the fluid is discharged via at least one of flow paths within the blade and components surrounding the blade.

8. A turbomachine in accordance with claim 7, wherein the fluid is discharged in free flow.

9. A turbomachine in accordance with claim 7, comprising at least one restrictor unit arranged in a flow path of the fluid led away from the annulus.

10. A turbomachine in accordance with claim 2, comprising, simultaneously with the means for removal of the fluid, means for fluid supply positioned at least one of before or within a bladed space of the same blade areas of the rotor/stator.

11. A turbomachine in accordance with claim 2, wherein the blade tip and annulus surfaces are provided in the form of at least one of surfaces on a hub and casing contours of the annulus, with firm connection to the blade, between a trailing edge plane HK and a plane which is located 25 percent of a meridional blade chord length Cm before a leading edge plane VK.

12. A turbomachine in accordance with claim 1, wherein the blade tip and annulus surfaces are provided in the form of at least one of surfaces on a hub and casing contours of the annulus, with firm connection to the blade, between a trailing edge plane HK and a plane which is located 25 percent of a meridional blade chord length Cm before a leading edge plane VK.

13. A turbomachine in accordance with claim 1, wherein the means for removal of the fluid are provided on free blade ends, facing at least one of a hub and a casing contour of the annulus.

14. A turbomachine in accordance with claim 1, wherein the fluid is completely discharged from the turbomachine.

15. A turbomachine in accordance with claim 1, wherein the fluid is returned to the turbomachine.

16. A turbomachine in accordance with claim 1, wherein the fluid is discharged via at least one slot.

17. A turbomachine in accordance with claim 1, wherein the fluid is discharged via at least one row of holes.

18. A turbomachine in accordance with claim 1, wherein the fluid is discharged via at least one ramming inlet.

19. A turbomachine as in claim 1, wherein the means for removal of the fluid are in the form of at least one interrupted circumferential slot.

20. A turbomachine as in claim 1, wherein the means for removal of the fluid are in the form of at least one continuous circumferential slot which varies in its meridional positioning around a circumference of the annulus surfaces.

21. A turbomachine as in claim 1, wherein the means for removal of the fluid are in the form of at least one pattern of repeating holes.

22. A turbomachine comprising:
at least one rotor, with the rotor comprising several rotor blades attached to a rotating shaft,
a casing which is passed by a fluid flowing through the rotor,
at least one stator equipped with stationary stator blades which is passed by the fluid,
means for removal of the fluid provided at at least one stator blade on aerodynamically critical locations, wherein the means for fluid removal is provided on at least one stator free blade end, facing at least one of a hub and a casing contour of the annulus.

23. A turbomachine in accordance with claim 22, comprising, simultaneously with the means for removal of the fluid, means for fluid supply positioned at least one of before or within a bladed space of the same blade areas of the rotor/stator.

24. A turbomachine comprising:
at least one rotor, with the rotor comprising several rotor blades attached to a rotating shaft,
a casing which is passed by a fluid flowing through the rotor,
at least one stator equipped with stationary stator blades which is passed by the fluid,
means for removal of the fluid provided on at least one blade of a stator row, which means are distributed on a blade side over a defined area in a meridional flow direction, wherein the defined area has a meridional streamwise extent which is at a maximum at a given blade height and which decreases from the maximum as the defined area extends toward at least one end of the blade, wherein at the maximum meridional streamwise extent, the means for removal of fluid includes a plurality of openings spaced apart from one another along the meridional flow direction.

25. A turbomachine in accordance with claim 24, comprising, simultaneously with the means for removal of the fluid, means for fluid supply positioned at least one of before or within a bladed space of the same blade areas of the rotor/stator.

26. A turbomachine comprising:
at least one rotor, with the rotor comprising several rotor blades attached to a rotating shaft,
a casing which is passed by a fluid flowing through the rotor,
means for removal of the fluid provided at at least one blade of a blade row of the rotor on aerodynamically critical locations, wherein the means for fluid removal is on at least one rotor free blade end, facing at least one of a hub and a casing contour of the annulus.

27. A turbomachine in accordance with claim 26, comprising, simultaneously with the means for removal of the fluid, means for fluid supply positioned at least one of before or within a bladed space of the same blade areas of the rotor/stator.

28. A turbomachine comprising:
at least one stator equipped with stationary stator blades which is passed by a fluid,
a casing which is passed by the fluid flowing through the stator,
means for removal of the fluid provided at at least one blade of a blade row of the stator on aerodynamically critical locations on at least one of a blade tip and annulus surfaces, wherein the at least one of the blade tip and annulus surfaces are provided in the form of at least one of surfaces on a hub and casing contours of the annulus, in an area of free blade ends, between a trailing edge plane HK and a plane which is located 25 percent of a meridional chord length Cm before a leading edge plane VK, the means for fluid removal being arranged on the annulus surfaces in a circumferentially non-uniform pattern, said pattern repeating in the circumferential direction.

29. A turbomachine in accordance with claim 28, comprising, simultaneously with the means for removal of the fluid, means for fluid supply positioned at least one of before or within a bladed space of the same blade areas of the rotor/stator.

30. A turbomachine as in claim 28, wherein the means for removal of the fluid are in the form of at least one interrupted circumferential slot.

31. A turbomachine as in claim 28, wherein the means for removal of the fluid are in the form of at least one continuous circumferential slot which varies in its meridional positioning around a circumference of the annulus surfaces.

32. A turbomachine as in claim 28, wherein the means for removal of the fluid are in the form of at least one pattern of repeating holes.

33. A turbomachine comprising:
at least one rotor, with the rotor comprising several rotor blades attached to a rotating shaft,
a casing which is passed by a fluid flowing through the rotor,
means for removal of the fluid provided at at least one blade of a blade aerodynamically critical locations on at least one of a blade tip and annulus surfaces, wherein the at least one of the blade tip and annulus surfaces are provided in the form of at least one of surfaces on a hub and casing contours of the annulus, with firm connection to the blade, between a trailing edge plane HK and a plane which is located 25 percent of a meridional blade chord length Cm before a leading edge plane VK, the means for removal of the fluid including at least one aperture positioned within a blade passage between adjacent blades and being more centered towards a suction side than a pressure side of the adjacent blades, the aperture having a maximum width that does nor exceed 15% of an exit spacing of the adjacent blades.

34. A turbomachine in accordance with claim 33, comprising, simultaneously with the means for removal of the fluid, means for fluid supply positioned at least one of before or within a bladed space of the same blade areas of the rotor/stator.

35. A turbomachine comprising:
at least one stator equipped with stationary stator blades which is passed by a fluid,
a casing which is passed by the fluid flowing through the stator,
means for removal of the fluid provided at at least one blade of a blade row of the stator on aerodynamically critical locations on at least one of a blade tip and annulus surfaces, wherein the at least one of the blade tip and annulus surfaces are provided in the form of at least one of surfaces on a hub and casing contours of the annulus, with firm connection to the blade, between a trailing edge plane HK and a plane which is located 25 percent of a meridional blade chord length Cm before a leading edge plane VK, the means for removal of the fluid including at least one aperture positioned within a blade passage between adjacent blades and being more centered towards a suction side than a pressure side of the adjacent blades, the aperture having a maximum width that does not exceed 15% of an exit spacing of the adjacent blades.

36. A turbomachine in accordance with claim 35, comprising, simultaneously with the means for removal of the fluid, means for fluid supply positioned at least one of before or within a bladed space of the same blade areas of the rotor/stator.

37. A turbomachine comprising:
at least one rotor, with the rotor comprising several rotor blades attached to a rotating shaft,
a casing which is passed by a fluid flowing through the rotor,
at least one stator equipped with stationary stator blades which is passed by the fluid,
means for removal of the fluid provided at at least one blade of at least one of the rotor and the stator on aerodynamically critical locations on at least one of a blade tip and annulus surfaces, and further comprising, simultaneously with the means for removal of the fluid, means for fluid supply positioned at least one of before and within a bladed space of the same blade areas of the rotor/stator.

* * * * *